United States Patent
Sodeura et al.

(10) Patent No.: US 7,619,785 B2
(45) Date of Patent: Nov. 17, 2009

(54) IMAGE READING APPARATUS AND REFERENCE MEMBER FOREIGN MATTER DETECTING METHOD

(75) Inventors: Minoru Sodeura, Ebina (JP); Satoshi Mizuhashi, Ebina (JP); Yasuhisa Mizuta, Ebina (JP); Yoshitake Matsubara, Ebina (JP); Sadao Furuoya, Ebina (JP); Ayumi Onishi, Ebina (JP); Masato Saito, Ebina (JP); Hiroshi Hagiwara, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 938 days.

(21) Appl. No.: 10/937,446

(22) Filed: Sep. 10, 2004

(65) Prior Publication Data

US 2005/0206968 A1 Sep. 22, 2005

(30) Foreign Application Priority Data

Mar. 22, 2004 (JP) ............................. 2004-082860

(51) Int. Cl.
*H04N 1/04* (2006.01)
*H04N 1/40* (2006.01)
(52) U.S. Cl. .................................. 358/474; 358/461
(58) Field of Classification Search .............. 347/129, 347/112, 111; D14/420, 356, 300, 453, 432; 368/62, 82, 83, 223, 239, 241; 358/474, 358/471, 400, 461
See application file for complete search history.

(56) References Cited

U.S. PATENT DOCUMENTS

| 5,317,421 A * | 5/1994 | Ito ............................... 358/464 |
| 5,432,337 A * | 7/1995 | Kato et al. ................... 250/221 |
| 5,754,828 A * | 5/1998 | Adan et al. ................... 703/24 |
| 6,292,269 B1 * | 9/2001 | Kawai ......................... 358/1.9 |
| 2004/0008386 A1 * | 1/2004 | Shiraishi ...................... 358/474 |
| 2005/0179954 A1 * | 8/2005 | Arai et al. ................... 358/3.26 |

FOREIGN PATENT DOCUMENTS

| JP | 2-56168 A | 2/1990 |
| JP | 4-115663 A | 4/1992 |
| JP | 2000-358195 A | 12/2000 |
| JP | A 2001-313794 | 11/2001 |
| JP | 2002-344738 A | 11/2002 |

OTHER PUBLICATIONS

Lumileds Application Overview; Document No. BR02; p. 3.*

* cited by examiner

*Primary Examiner*—Gabriel I Garcia
(74) *Attorney, Agent, or Firm*—Oliff & Berridge, PLC

(57) ABSTRACT

An image reading apparatus includes: a light source that irradiates a document; a sensor that receives reflection light reflected from the document; a reference member that is read by the sensor; and an abnormal site detection unit that detects, using first reading data acquired by reading the reference member according to a first reading condition set to the light source or the sensor and second reading data acquired by reading the reference member according to a second reading condition, which is different from the first reading condition, set to the light source or the sensor, abnormal sites in the first reading data or the second reading data.

11 Claims, 19 Drawing Sheets

IMAGE READING APPARATUS AND REFERENCE MEMBER FOREIGN MATTER DETECTING METHOD

BACKGROUND OF THE INVENTION

1. Field of the Invention

The present invention relates to an image reading apparatus that reads an image on a document, and more particularly to an image reading apparatus that includes a reference member for conducting shading correction.

2. Description of the Related Art

It is known to provide image reading apparatuses that automatically read image information of a document are used as reading devices, such as those of copiers and fax machines, and as scanners for computer input. This type of image reading apparatus reads an image on a document by irradiating the document with light, using a light source that extends in a direction orthogonal to the document conveyance path, and receiving reflection light reflected from the irradiated document with an image sensor.

With this kind of image reading apparatus, situations arise where there are variations in the amount of light emitted from the light source, due to its position in the direction orthogonal to the document conveyance path, and the amount of light of the light source fluctuates over time. When fluctuations in the amount of light arise, such as when the image reading apparatus reads a document on which a half-tone image is uniformly formed, the outputted image signal becomes nonuniform and includes variations corresponding to the amount of light of the light source.

Thus, a technique is widely used where a white member (white reference member) that extends in the direction orthogonal to the document conveyance path is disposed facing the light source, the white reference member is irradiated with light from the light source, an image sensor receives reflection light reflected from the white reference member, and correction data (shading data) corresponding to the illumination distribution in the direction orthogonal to the document conveyance direction are acquired in advance. Then, at the time the document is actually read, the image data obtained by reading the document are corrected (shading correction) using the shading data, whereby irregularities resulting from the light amount distribution of the light source are removed.

There is the potential for dust and dirt to adhere to the white reference member, and when shading correction of the read image is conducted with the shading data obtained by reading the white reference member in this state, stripes arise at sites corresponding to the portions to which the dust and dirt are adherent. Thus, conventionally, image reading apparatuses have been configured so that the shading data is acquired at plural positions of the white reference member by moving the sensor or a mirror, and the whitest data are used as the shading data.

However, in the known image reading apparatus, it is difficult to acquire the shading data at plural positions of the white reference member because the image sensor and the white reference member are fixedly disposed.

SUMMARY OF THE INVENTION

The present invention has been made in view of the above circumstances

According to an aspect of the present invention, the image reading apparatus includes: a light source that irradiates a document; a sensor that receives reflection light reflected from the document; a reference member that is read by the sensor; and an abnormal site detection unit that detects, using first reading data acquired by reading the reference member according to a first reading condition set to the light source or the sensor and second reading data acquired by reading the reference member according to a second reading condition, which is different from the first reading condition, set to the light source or the sensor, abnormal sites in the first reading data or the second reading data.

According to another aspect of the invention, the image reading apparatus includes: a light source that irradiates a document; a sensor that receives reflection light reflected from the document; a reference member that is read by the sensor; and an abnormal place detection unit that detects, on the basis of results where the same position of the reference member is read plural times under different reading conditions using the light source and the sensor, abnormal places in the reference member.

According to another aspect of the invention, the reference member foreign matter detecting method includes: reading a reference member under a first reading condition to acquire first reading data; reading the reference member under a second reading condition that is different from the first reading condition to acquire second reading data; and using the first reading data and the second reading data to detect the adherence of foreign matter to the reference member.

BRIEF DESCRIPTION OF THE DRAWINGS

Embodiments of the present invention will be described in detail based on the following figures, wherein.

DETAILED DESCRIPTION OF THE INVENTION

Figure 1:
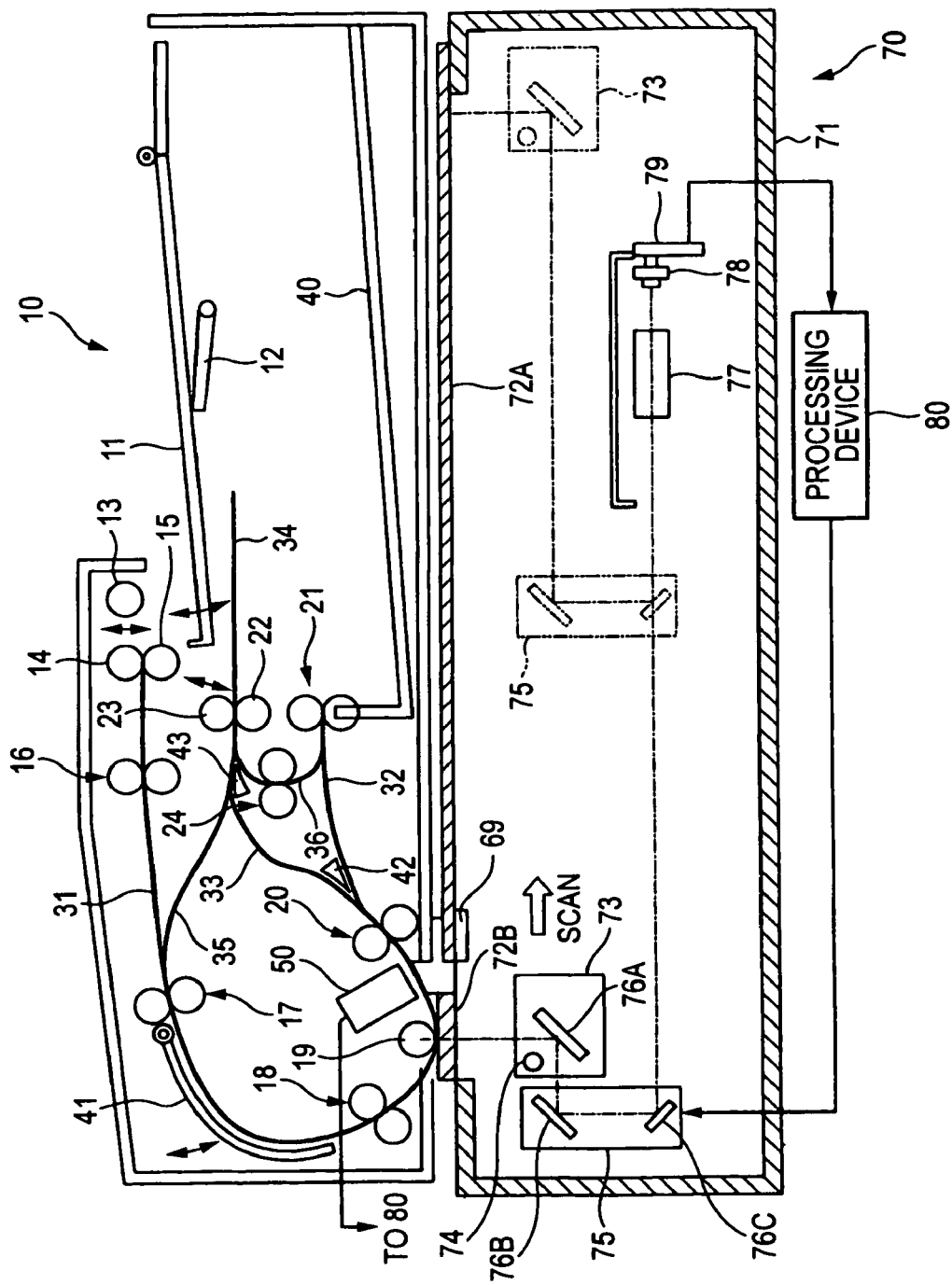
FIG. 1 is a diagram showing an image reading apparatus to which an embodiment of the invention has been applied.

FIG. 1 is a diagram showing an image reading apparatus to which a first embodiment of the invention has been applied. The image reading apparatus is broadly divided into a document sending device 10, which sequentially conveys documents from a loaded document stack, a scanner device 70, which serves as a second reading unit that reads images with a scanner, and a processing device 80 that processes read image signals.

As an example of the constituent elements of a paper supply unit of the document sending device 10, the document sending device 10 is disposed with a document tray 11, in which a document stack comprising plural sheets of documents is loaded, and a tray lifter 12, which raises and lowers the document tray 11. The document sending device 10 is also disposed with a nudger roll 13 that conveys the documents of the document tray 11 raised by the tray lifter 12, a feed roll 14 that further conveys downstream the documents of the document tray 11 raised by the nudger roll 13, and a retard roll 15 that sorts, one sheet at a time, the documents supplied by the nudger roll 13. A first conveyance path 31 serving as a conveyance path on which the documents are initially conveyed is disposed with takeaway rolls 16 that convey, to downstream rolls, the documents sorted one sheet at a time, preregistration rolls 17 that further convey the document to downstream rolls and conduct loop formation, registration rolls 18 that resume rotation in exact timing after temporarily stopping and supply the documents while adjusting the registration of the documents with respect to a document reading unit, a platen roll 19 that assists the conveyance of the documents during reading, and out rolls 20 that further convey the read documents downstream. The first conveyance path 31 is also disposed with a baffle 41 that pivots around a fulcrum in accordance with the looped state of the conveyed documents. Moreover, a CIS (Contact Image Sensor) 50 is disposed between the platen roll 19 and the out rolls 20.

A second conveyance path 32 and a third conveyance path 33 are disposed downstream of the out rolls 20. The second conveyance path 32 and the third conveyance path 33 are disposed with a conveyance path switching gate 42 that switches these conveyance paths, a discharge tray 40 in which read documents are placed, and first discharge rolls 21 that discharge the documents with respect to the discharge tray 40. The document sending device 10 is also disposed with a fourth conveyance path 34 that causes the documents conveyed via the third conveyance path 33 to be switched back; an inverter roll 22 and an inverter pinch roll 23 that are disposed in the fourth conveyance path 34 and actually conduct document switchback; a fifth conveyance path 35 that guides, back to the first conveyance path 31 disposed with the preregistration rolls 17, the documents switched back by the fourth conveyance path 34; a sixth conveyance path 36 that discharges, into the discharge tray 40, the documents switched back by the fourth conveyance path 34; second discharge rolls 24 that are disposed in the sixth conveyance path 36 and convey the invertedly discharged documents to the first discharge rolls 21; and an outlet switching gate 43 that switches the conveyance paths of the fifth conveyance path 35 and the sixth conveyance path 36.

The nudger roll 13 is lifted up and retained at a standby position during standby, and is lowered to a nipping position (document conveyance position) to convey the uppermost document in the document tray 11 during document conveyance. The nudger roll 13 and the feed roll 14 conduct document conveyance by the coupling of a feed clutch (not shown). The preregistration rolls 17 cause the leading end of the document to abut against the stopped registration rolls 18 so that the document forms a loop. The registration rolls 18 return the leading end of the document nipped between the registration rolls 18 to the nipping position at the time of loop formation. When this loop is formed, the baffle 41 opens around the fulcrum and functions so as not to obstruct the loop formed in the document. Also, the takeaway rolls 16 and the preregistration rolls 17 retain the document loop during reading. Due to this loop formation, adjustment of the reading timing can be improved, skewing accompanying document conveyance at the time of reading can be suppressed, and the alignment adjusting function can be raised. The stopped registration rolls 18 begin rotating to match the timing at which reading starts, the document is pressed against a second platen glass 72B (described later) by the platen roll 19, and image data is read from an undersurface direction by a later-described CCD image sensor 78.

When reading of a one-sided document ends, and when simultaneous reading of both sides of a two-sided document ends, the conveyance path switching gate 42 is switched to guide the document passing through the out rolls 20 to the second conveyance path 32 and discharge the document into the discharge tray 40. When a two-sided document is sequentially read, the conveyance path switching gate 42 is switched to guide the document to the third conveyance path 33 in order to invert the document. When a two-sided document is sequentially read, the inverter pinch roll 23 is retracted in a state where the feed clutch (not shown) is OFF, so that the nip with the inverter roll 22 is released, and the document is guided to the fourth conveyance path (inverter path) 34. Thereafter, the inverter pinch roll 23 forms the nip with the inverter roll 22, the document inverted by the inverter roll 22 is guided to the preregistration rolls 17, and the invertedly discharged document is conveyed to the second discharge rolls 24 of the sixth conveyance path 36.

The scanner device 70 is configured so that the document sending device 10 can be placed thereon and is disposed with a device frame 71 that supports the document sending device 10. The scanner device 70 conducts image reading of the documents conveyed by the document sending device 10. The scanner device 70 includes, on the device frame 71 that forms a casing, a first platen glass 72A on which a document whose image is to be read is placed in a state where the document is stationary, and the second platen glass 72B that includes an open portion through which light for reading a document being conveyed by the document sending device 10 passes. A white reference plate 69 is disposed, parallel to the second platen glass 72B, near the second platen glass 72B and at the underside (inside the scanner device 70) of the first platen glass 72A.

The scanner device 70 is also disposed with a full-rate carriage 73, which is stationary below the second platen glass 72B and scans the entire first platen glass 72A to read an image, and a half-rate carriage 75, which provides light obtained from the full-rate carriage 73 to an image coupling unit. The full-rate carriage 73 is disposed with an Xe (xenon) lamp 74 that irradiates the document with light and a first mirror 76A that receives reflection light obtained from the document. Moreover, the half-rate carriage 75 is disposed with a second mirror 76B and a third mirror 76C that provide the light obtained from the first mirror 76A to an imaging unit.

Additionally, the scanner device 70 is disposed with an imaging lens 77, which optically reduces the optical image obtained from the third mirror 76C, a CCD (Charge Coupled Device) image sensor 78, which photoelectrically converts the optical image imaged by the imaging lens 77, and a drive substrate 79 to which the CCD image sensor 78 is attached. Image signals obtained by the CCD image sensor 78 are sent to the processing device 80 via the drive substrate 79. In other words, the scanner device 70 causes an image to be imaged on the CCD image sensor 78 serving as an image sensor using a so-called reduction optical system.

Here, first, when an image of a document placed on the first platen glass 72A is to be read, the full-rate carriage 73 and the half-rate carriage 75 move in a scanning direction (direction of the arrow in FIG. 1) at a ratio of 2:1. At this time, the side of the document to be read is irradiated with the light of the Xe lamp 74 of the full-rate carriage 73, and the light reflected from the document is reflected at the first mirror 76A, the second mirror 76B and the third mirror 76C in this order, and guided to the imaging lens 77. The light guided to the imaging lens 77 is imaged on a light-receiving surface of the CCD image sensor 78. The CCD image sensor 78 is a one-dimensional sensor that simultaneously processes single lines. The full-rate carriage 73 is moved in this line direction (main scanning direction) to read the next line of the document. By executing this across the entire document, one-page document reading is completed.

The second platen glass 72B is configured by a transparent glass plate that has, for example, a long planar structure. The document conveyed by the document sending device 10 passes over the second platen glass 72B. At this time, the full-rate carriage 73 and the half-rate carriage 75 are in a state where they are stopped at the positions represented by the solid lines shown in FIG. 1. First, the reflection light of the first line of the document passing the platen roll 19 of the document sending device 10 is imaged at the imaging lens 77 via the first mirror 76A, the second mirror 76B and the third mirror 76C, and the image is read by the CCD image sensor 78, which is a first sensor in the present embodiment. Namely, after single lines in the main scanning direction are simultaneously processed by the CCD image sensor 78, which is a one-dimensional sensor, the next main-scanning-direction line of the document conveyed by the document sending device 10 is read. After the leading end of the document reaches a reading position of the second platen glass 72B, the document passes the reading position of the second platen glass 72B and one-page document reading is completed across a sub-scanning direction.

In the present embodiment, it is possible to simultaneously read the first side of a document with the CIS 50, which is a first reading unit, as the second side of the same document is read by the CCD image sensor 78 at the second platen glass 72B while the full-rate carriage 73 and the half-rate carriage 75 are stopped (here, "simultaneously" does not mean that both sides of the same document are read at precisely the same time, but rather that both sides of the same document are read around the same time during conveyance of the document). Namely, using the CCD image sensor 78 and the CIS 50, it is possible to simultaneously read images on both the front and back sides of a document by one-time conveyance of the document to the conveyance paths.

Figure 2:
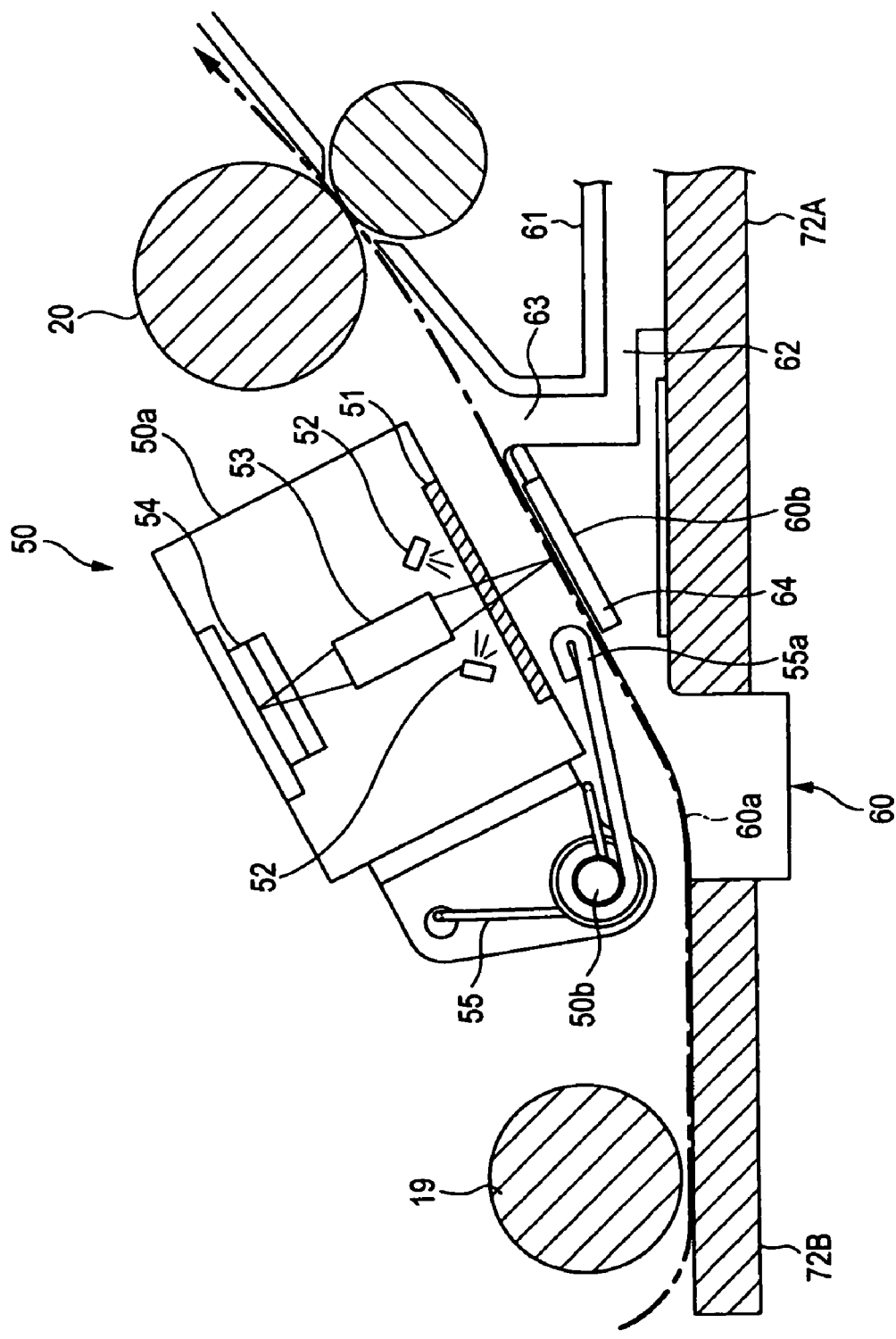
FIG. 2 is a diagram for describing a reading structure using a CIS.

FIG. 2 is a diagram for describing a reading structure using the CIS 50 as a reading unit. As shown in FIG. 2, the CIS 50 is disposed between the platen roll 19 and the out rolls 20. One side (first side) of the document is pressed against the second platen glass 72B, and an image on this first side is read by the CCD image sensor 78. An image on the other side (second side) of the document is read by the CIS 50 from the opposite side via the conveyance path conveying the document. The CIS 50 is disposed with a housing 50a, a cover glass (glass) 51 attached to an open portion disposed in the housing 50a, LEDs (Light Emitting Diodes) 52 serving as light sources that irradiate the second side of the document with light through the cover glass 51, a SELFOC lens 53 that is a lens array which focuses the light reflected from the LEDs 52, and a line sensor 54 serving as a sensor (image sensor) that reads the light focused by the SELFOC lens 53. A CCD, a CMOS sensor or a close-coupled sensor can be used as the line sensor 54, so that it is possible to read an image of an exact dimensional width (e.g., A4, longitudinal width of 297 mm). Because the CIS 50 conducts image reading using the SELFOC lens 53 and the line sensor 54 and does not use a reduction optical system, its structure can be simplified, the casing can be made compact, and power consumption can be reduced. In a case where a color image is to be read, LED light sources of the three colors of R (red) B (blue) and G (green) may be combined with the LEDs 52, or, a white LED light source may be used and a set of three rows of sensors for the three colors of R, G and B may be used as the line sensor 54.

The CIS 50 is also disposed with a control member 55, which extends from the casing of the CIS 50 to the conveyance path configuring this reading unit during image reading by the CIS 50, and an abutment member 60 that abuts against the document pressed by the control member 55. The control member 55 is attached to the document sending device 10 (see FIG. 1) via the CIS 50, but the abutment member 60 is attached to the scanner device 70 (see FIG. 1). Also, a guide member 61 is disposed downstream of the abutment member 60, an open portion 63 is formed between the guide member 61 and the abutment member 60, and a dust collecting unit 62 serving as a recovery unit that collects dust and dirt adhering to the surface of the document is disposed at a place below the guide member 61 and is continuous with the open portion 63. The control member 55 and the abutment member 60 are disposed in correspondence to the position of the conveyance path in the direction orthogonal to the document conveyance path (i.e., in the direction from the front side to the rear side of the document sending device) from the front side to the rear side of the document sending device.

Here, the control member 55 is configured by a plate spring comprising a substantially L-shaped steel plate wound around a shaft 50b disposed in the CIS 50. The control member 55 is configured to be flexible so that it can absorb the thick portion of the conveyed documents and stably convey creased documents. A leading end of the control member 55 extends as far as the vicinity of the position where the document is read by the CIS 50, and a hemming-folded fold portion 55a is disposed at the site contacting the paper, so that the control member 55 smoothly contacts the paper and can prevent paper dust. The distance (gap for passing the documents) between the fold portion 55a of the control member 55 and the abutment member 60 is set to be about 0.1 to about 1.0 mm.

The abutment member 60 serving as a guide portion includes a conveyance surface 60a, which is disposed upstream in the document conveyance direction and guides the conveyed documents, and a stepped surface 60b, which is disposed further downstream in the document conveyance direction than the conveyance surface 60a and is formed lower than the conveyance surface 60a. The stepped surface 60b is formed so as to face an extension line of a focus point of the light focused by the SELFOC lens 53, and white reference tape 64 serving as a reference member comprising biaxial stretched polyester film is adhered to the stepped surface 60b. Thus, the white reference tape 64 is attached to the scanner device 70 via the abutment member 60. In the present embodiment, the white reference tape 64 is disposed in a state where an upper surface of the white reference tape 64 is exposed to the conveyance path.

Moreover, because the CIS 50 uses the SELFOC lens 53 for an optical imaging lens, the focal (field) depth is ±0.3 mm, which is shallow and about ⅓ or less in comparison to the case using the scanner device 70. For this reason, during reading by the CIS 50, it is preferable to determine the reading position of the document within a predetermined narrow range. Thus, in the present embodiment, the invention is configured so that the control member 55 is disposed facing the conveyance path, and the document is pushed against the abutment member 60 by the control member 55 and conveyed, so that the orientation of the document between the platen roll 19 and the out rolls 20 can be stably controlled. The direction of the dotted line in FIG. 2 represents the movement of the document when the control member 55 is disposed. It can be understood that the document is pushed against the abutment member 60 by the control member 55 and conveyed. Namely, because the document conveyed by the control member 55 is read in a state where the document is pushed against the abutment member 60, the quality of the focus when the CIS 50, which has a shallow depth of field, is used is improved.

Next, the processing device 80 shown in FIG. 1 will be described.

Figure 3:
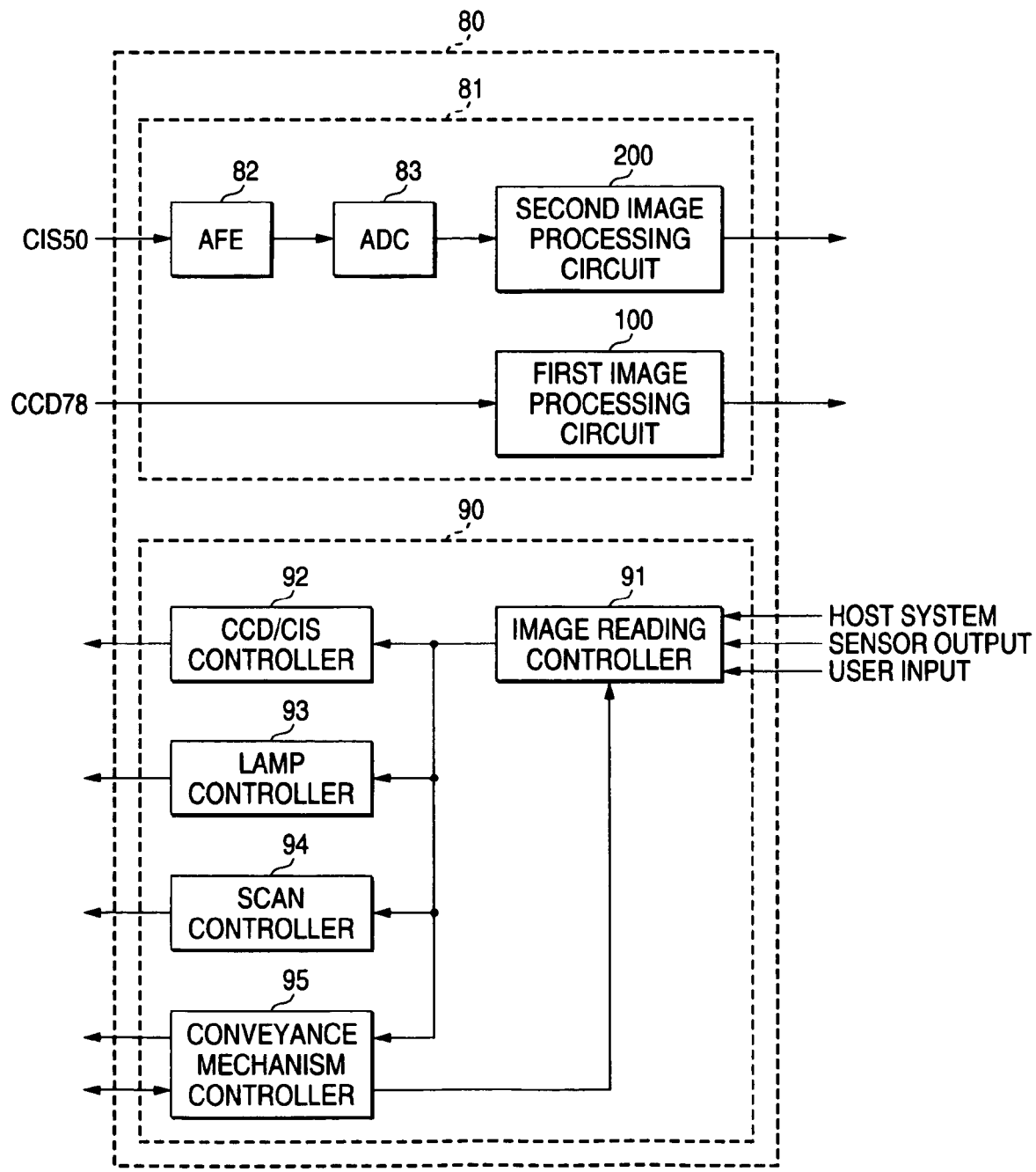
FIG. 3 is a block diagram for describing a processing device.

FIG. 3 is a block diagram for describing the processing device 80. The processing device 80 to which the present embodiment has been applied is broadly disposed with a signal processing unit 81, which processes the image signals obtained from the sensors (the CCD image sensor 78 and the CIS 50), and a control unit 90 that controls the document sending device 10 and the scanner device 70. The signal processing unit 81 conducts predetermined image processing with respect to the outputs from the CCD image sensor 78 reading the front side (first side) of the document and the line sensor 54 of the CIS 50 reading the back side (second side) of the document. The signal processing unit 81 includes an AFE (Analog Front End) 82, which processes analog signals with respect to the output from the line sensor 54, and an ADC (Analog to Digital Converter) 83, which converts the analog signals to digital signals. However, the invention can also be configured so that these processing functions are realized inside the CIS 50. Also, the signal processing unit 81 is disposed with two types of image processing circuits that conduct various processing such as shading correction and offset correction with respect to the digital signals. The first is a first image processing circuit 100 that conducts image processing with respect to the image data of the front side (first side) of the document, and the second is a second image processing circuit 200 that conducts image processing with respect to the image data of the back side (second side) of the document. The outputs from these image processing circuits are outputted to a host system such as an image output terminal (IOT) like a printer or a personal computer (PC).

The control unit 90 is disposed with an image reading controller 91 that controls the entire document sending device 10 and scanner device 70 including control of various two-side reading and control of one-side reading; a CCD/CIS controller 92 that controls the CCD image sensor 78 and the CIS 50; a lamp controller 93 that controls the LEDs 52 of the CIS 50 and the Xe lamp 74 of the full-rate carriage 73 to match the reading timing; a scan controller 94 that turns a motor of the scanner device 70 ON and OFF and controls the scanning operations of the full-rate-carriage 73 and the half-rate carriage 75; and a conveyance mechanism controller 95 that controls a motor of the document sending device 10, the operation of the various rolls and the operation of the feed clutch, and the switching operation of the gates. Control signals are outputted from these various controllers to the document sending device 10 and the scanner device 70, so that control of these operations becomes possible on the basis of the control signals. The image reading controller 91 sets the reading mode and controls the document sending device 10 and the scanner device 70 on the basis of control signals from the host system, such as sensor outputs detected in the case of an automatic selection and reading function, and a selection from the user. Examples of the reading modes include a two-side simultaneous reading mode by one path (without inversion), an inverted two-side reading mode by an inversion path, and a one-side reading mode by one path.

Next, the functions and operations of the image processing circuits (the first image processing circuit 100 and the second image processing circuit 200) will be described.

Figure 4:
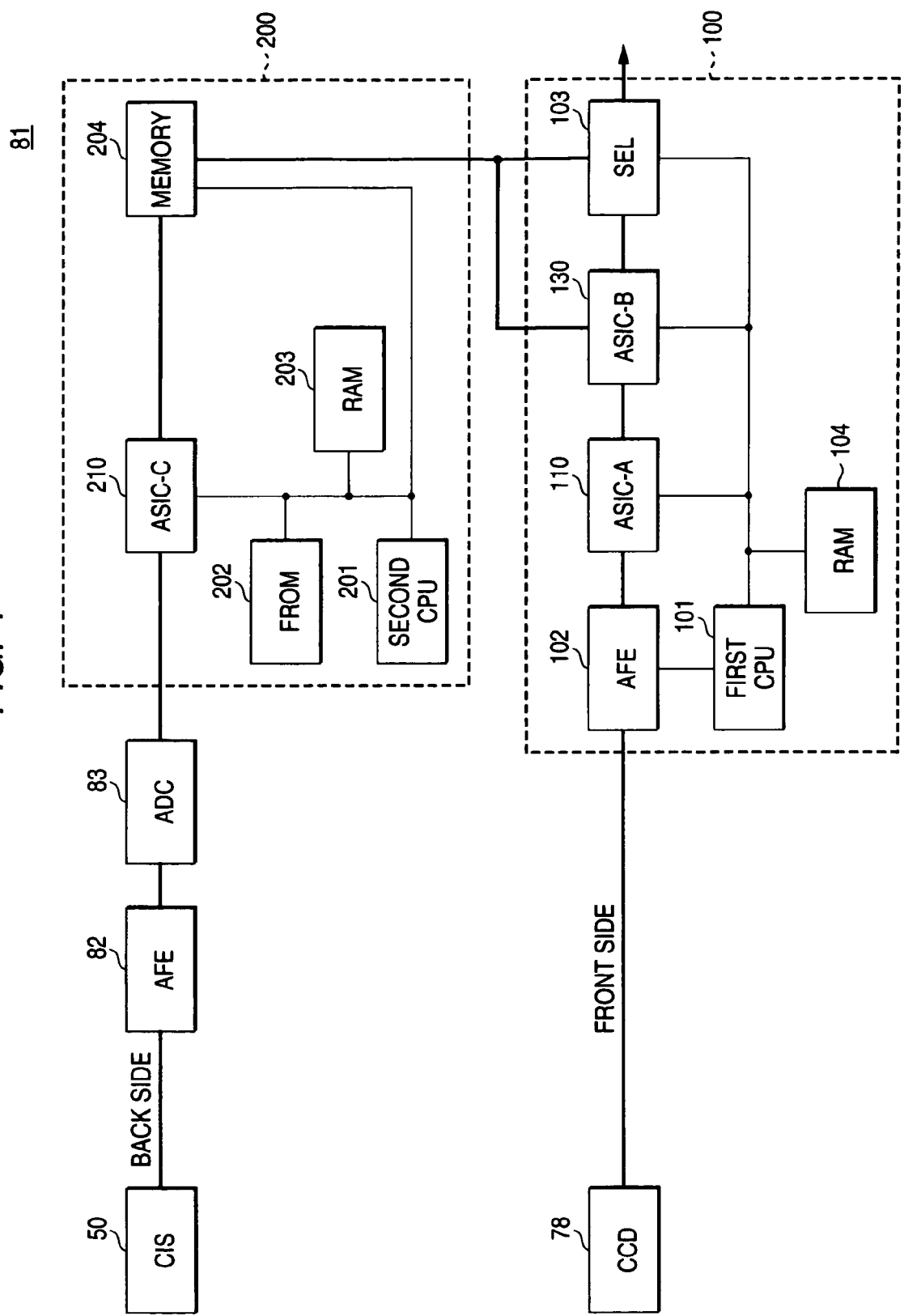
FIG. 4 is a block diagram describing in detail the configuration of a signal processing unit.

FIG. 4 is a block diagram describing in detail the configuration of the signal processing unit 81. The first image processing circuit 100 is disposed with a first CPU 101 that controls the entire first image processing circuit 100; an AFE 102 that conducts sample holding, offset correction and A/D conversion with respect to the front side image data outputted from the CCD image sensor 78; a selector (SEL) 103 for selecting and outputting the image data of both the front and back sides; and a RAM (Random Access Memory) 104 for temporarily storing reading data of the white reference plate 69 (see FIG. 1) read by the CCD image sensor 78. The first image processing circuit 100 is also disposed with an A integrated circuit (ASIC-A), which executes shading correction and line interpolation (RGB position shift interpolation), and a B integrated circuit (ASIC-B), which executes MTF filtering, reduction/enlargement processing and binarization processing.

The second image processing circuit 200 is disposed with a second CPU 201 that controls the entire second image processing circuit 200; a Flash ROM (FROM) 202 that saves (stores) white reference shading data at the time of factory shipment; a C integrated circuit (ASIC-C) 210 that conducts various image processing with respect to the back side image data obtained from the CIS 50; a RAM 203 that temporarily stores reading data of the white reference tape 64 (see FIG. 2) read by the CIS 50; and a memory 204 that retains the image-processed back side image data and outputs this image data to the selector 103 to match a predetermined output timing. In the present embodiment, white reference shading data obtained by the CIS 50, which is a close-coupled image sensor for reading the back side, reading the white reference tape 64 in advance at the time of factory shipment are saved in the Flash ROM (FROM) 202.

Figure 5:
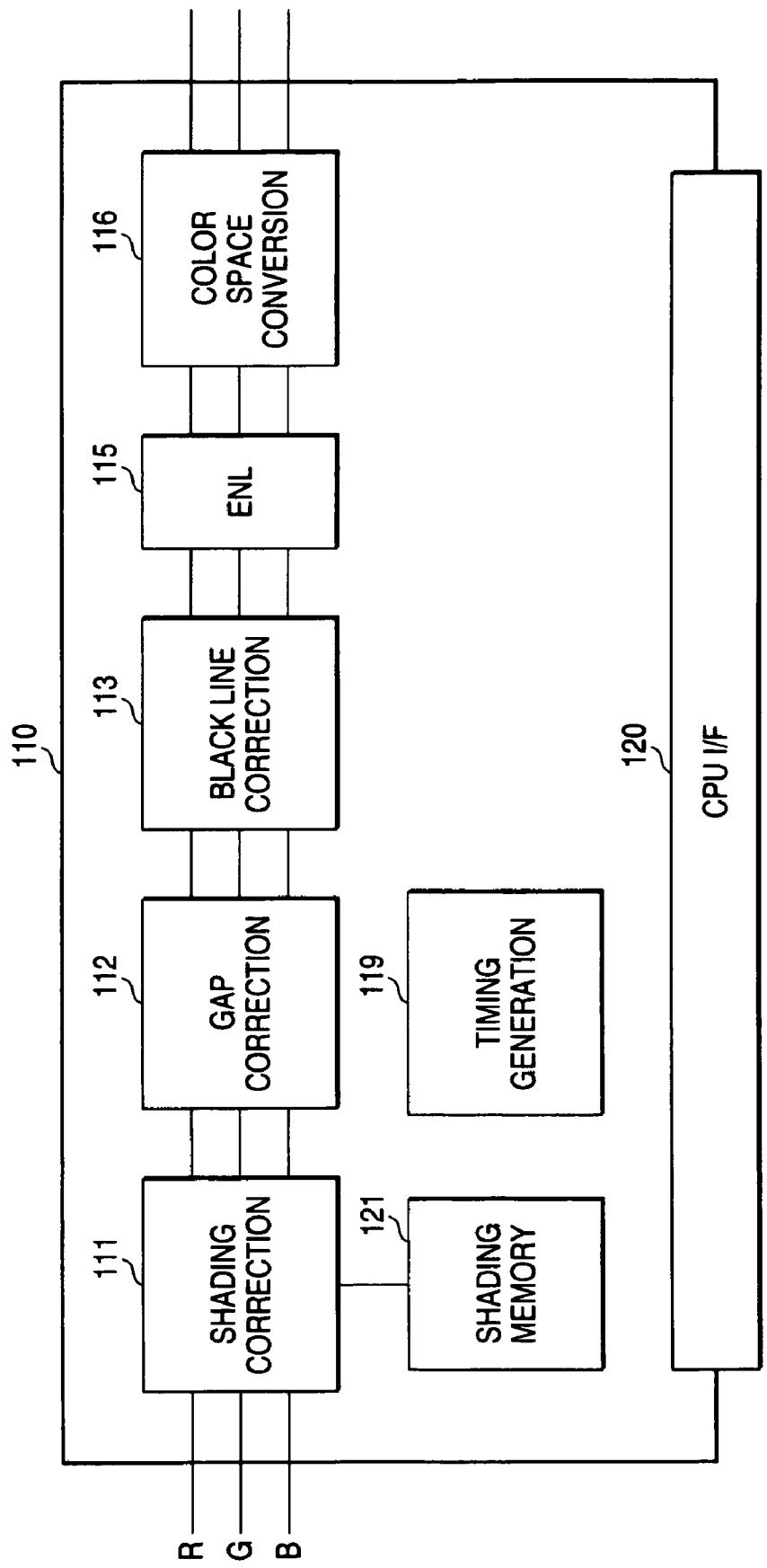
FIG. 5 is a block diagram showing the configuration of an A integrated circuit (ASIC-A)

FIG. 5 is a block diagram showing the configuration of the A integrated circuit (ASIC-A) 110. The A integrated circuit 110 is disposed with a shading correction unit 111 that conducts shading data correction in the CCD image sensor 78 on the basis of the shading data stored in a shading memory 121; a GAP correction unit 112 that corrects the positions of the line sensors of the three colors of R, G and B; a black line correction unit 113 that corrects black lines; an ENL 115 that conducts input-shade gradation correction; and a color space converter 116 that converts B, G and R to L*, a* and b*. The A integrated circuit 110 is also disposed with a timing generation unit 119, which generates drive clocks for the CCD image sensor 78 and the AFE 102, and a CPU interface 120 that communicates with the first CPU 101.

Figure 6:
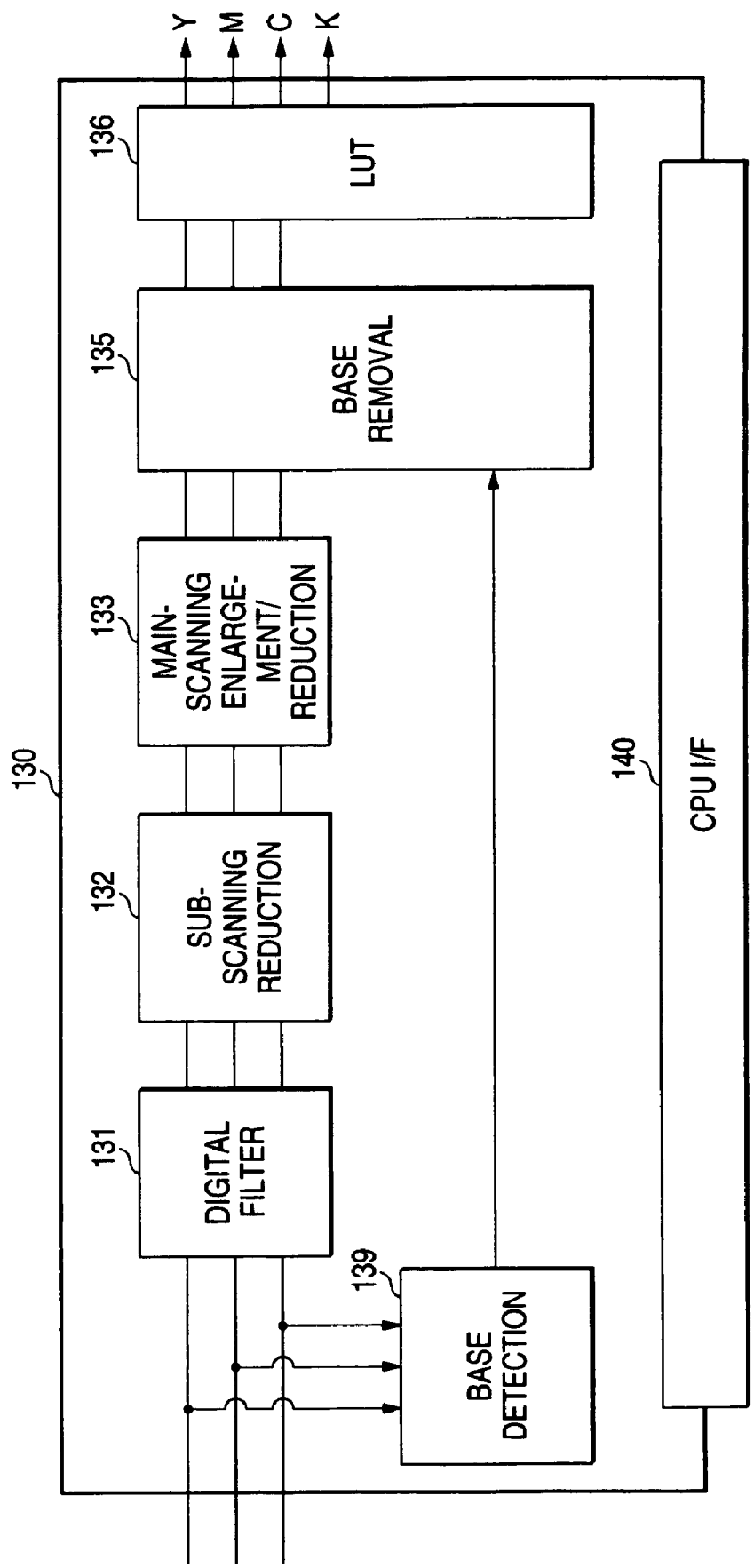
FIG. 6 is a block diagram showing the configuration of a B integrated circuit (ASIC-B)

FIG. 6 is a block diagram showing the configuration of the B integrated circuit (ASIC-B) 130. The B integrated circuit 130 is disposed with a digital filter unit 131 that conducts MTF correction and smoothing; a sub-scanning reduction unit 132 that conducts reduction processing with respect to the sub-scanning direction, which is the document conveyance direction; a main scanning enlargement/reduction unit 133 that conducts enlargement/reduction processing with respect to the main scanning direction, which is the direction orthogonal to the document conveyance direction and is the main scanning direction of the CCD image sensor 78; a base removal unit 135 that removes the base of the read document; and a lookup table (LUT) 136 that color-space converts L*, a* and b* to Y, M, C and K. The B integrated circuit 130 is also disposed with a base detection unit 139, which detects the base of the read document, and a CPU interface 140 that communicates with the first CPU 101.

Figure 7:
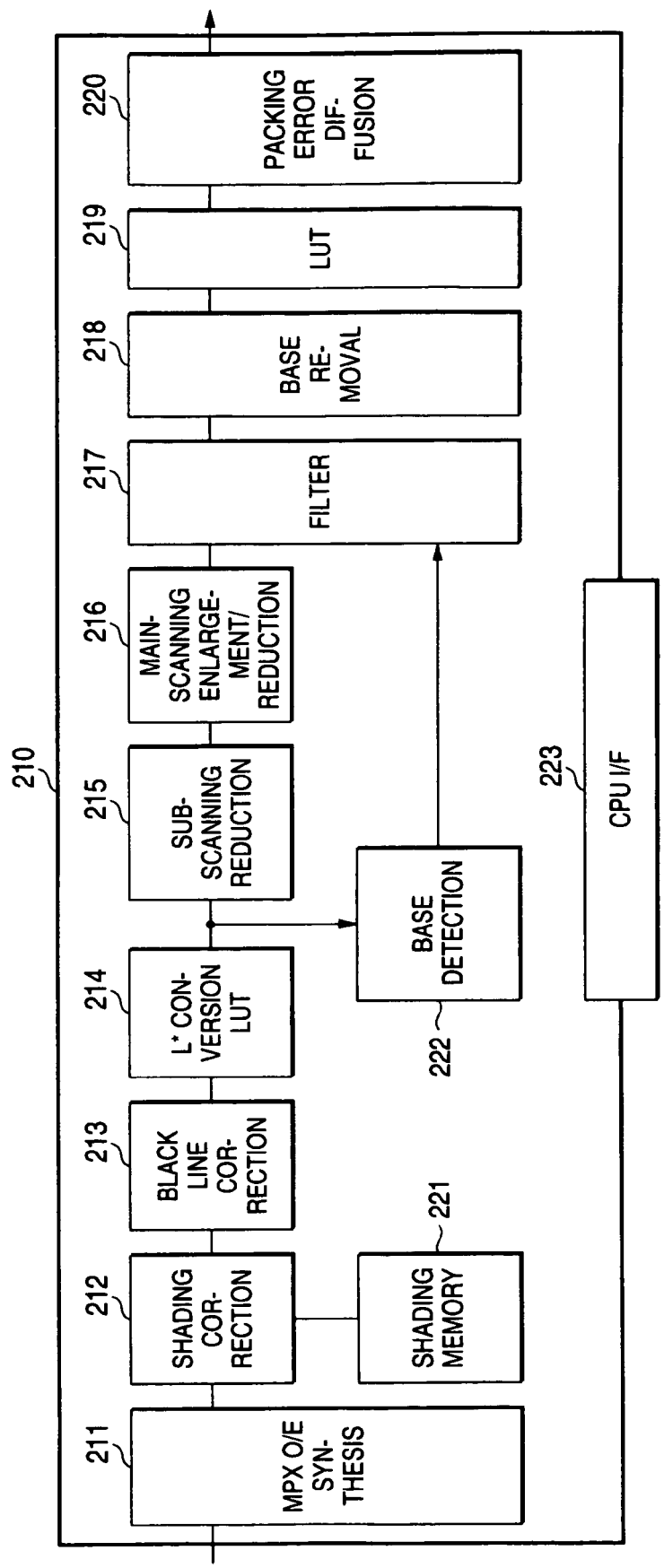
FIG. 7 is a block diagram showing the configuration of a C integrated circuit (ASIC-C)

FIG. 7 is a block diagram showing the configuration of the C integrated circuit (ASIC-C) 210. The C integrated circuit 210 is disposed with a multiplex (MPX) circuit 211 that synthesizes output signals of two channels comprising Odd/Evn; a shading correction unit 212 that conducts shading correction on the basis of shading data stored in a shading memory 221; a black line correction unit 213 that corrects black lines; an L* conversion (LUT) unit 214 that executes input-side gradation correction; a sub-scanning reduction unit 215 that conducts reduction processing with respect to the sub-scanning direction; a main scanning enlargement/reduction unit 216 that conducts enlargement/reduction processing with respect to the main scanning direction; a filter unit 217 that conducts MTF correction and smoothing; a base removal unit 218 that conducts base removal on the basis of the result of base detection by a base detection unit 222; a lookup (LUT) table 219 that conducts output gradation correction; and an error diffusion processing (packing error diffusion)) unit 220 that conducts binarization. The C integrated circuit 210 is also disposed with a CPU interface 223 that communicates with the second CPU 201.

Figure 8:
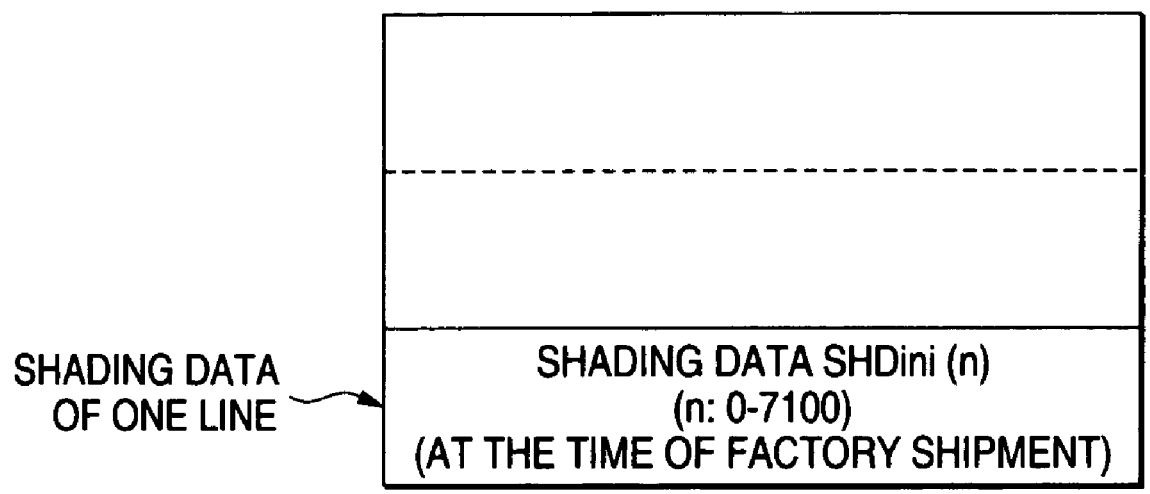
FIG. 8 is a diagram showing an example of data stored in a Flash ROM (FROM)

FIG. 8 is a diagram showing an example of data stored in the Flash ROM (FROM) 202. The shading data of one line shown in FIG. 8 are data acquired using the CIS 50, which is a close-coupled image sensor for back side reading, and the white reference tape 64 under predetermined conditions at the time of factory shipment, and data of one line comprising, for example, 7100 pixels×8 bits are stored in, for example, an 8-Kbyte area. About 200 LEDs 52 are disposed for one line in the CIS 50. In the description below, the shading data stored in the FROM 202 will be called initial shading data SHDini.

Figure 9:
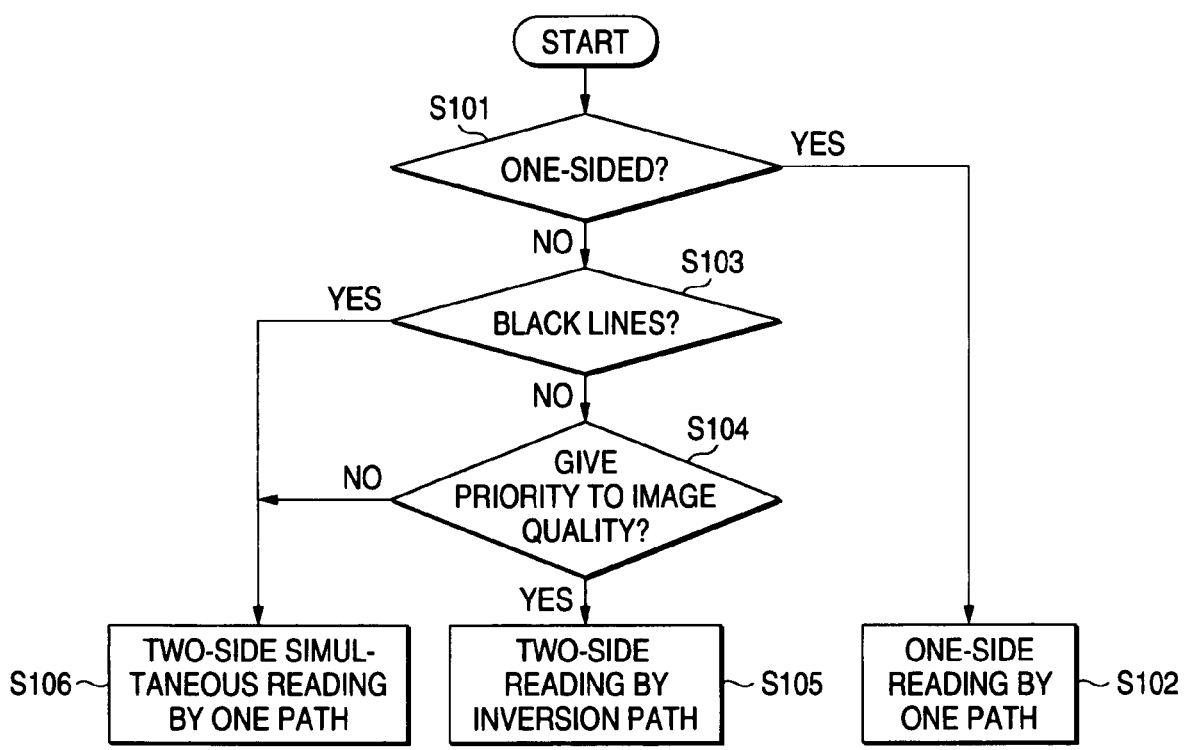
FIG. 9 is a flow chart showing an example of processing executed by image reading control.

FIG. 9 is a flow chart showing an example of processing executed by the image reading controller 91 shown in FIG. 3. First, in the image reading controller 91, it is determined whether or not the document to be conveyed is a one-sided document (step 101). This determination can be recognized by a selection from the user using a control panel (not shown) disposed on the scanner device 70, or in a case where an automatic selection and reading function is working, with sensors (not shown) disposed at both sides of the first conveyance path 31 prior to image reading. This determination can also be done by a request from the host system or by a selection from the user via a network. When it is determined in step 101 that the document is a one-sided document, one-side reading by one path (one-time document conveyance path not using the inversion path) is conducted (step 102). In this one-side reading by one path, either reading by the CCD image sensor 78 or reading by the CIS 50 may be selected, but in order to realize higher quality image reading, it is preferable to select reading by the CCD image sensor 78. In this case, one-sided documents are placed in the document tray 11 facing up so that the first page of the document comes up, and the documents are conveyed and sequentially read beginning with the first page.

Here, when the document is not a one-sided document in step 101, i.e., when the document is a two-sided document, it is determined whether or not the document is a black and white document (step 103). The determination in step 103 is done by a selection from the user or by an automatic selection and reading function in the same manner as in step 101. There are also cases where the user desires black and white reading even if the document is a color document. When black and white reading is not to be conducted, i.e., when color reading is to be conducted, it is determined whether or not the image quality is to be given priority (step 104). For example, in the case of a color image such as a color photograph or a pamphlet, usually image quality is given priority over productivity raising the reading speed. This determination is also done by the setting of the user. When it is determined in step 104 that image quality is to be given priority, two-side reading by the inversion path, which is a first two-side reading mode, is executed (step 105). Namely, reading by the CIS 50 is not conducted, and both the first side of the document and the second side of the document are read by the CCD image sensor 78, which is the first sensor. Thus, high-quality two-side reading using reading means whose focal depth is shallow becomes possible with respect to the first side of the document and the second side of the document.

Even in a case where black and white reading is to be conducted in step 103 or when color image output is needed in step 104, such as in cases where image quality is not to be given much priority and other factors like productivity are to be given priority, like in a case where slight colors such as business colors are not to be given priority or in the case of an additional color (cases including one other color other than black, like red or blue), two-side simultaneous reading by one path not using the inversion path, which is a second two-side reading mode, is conducted (step 106). Namely, the first side of the document is read by the CCD image sensor 78, which is the first sensor, and at the conveyance path of this reading, reading of the second side of the document by the CIS 50 is conducted at the same conveyance path. Thus, it is not necessary to convey the document twice to the same reading unit, the document reading speed can be improved, the conveyance path can be simplified, and document conveyance troubles such as paper jams can be suppressed. As mentioned previously, "simultaneous reading" does not mean necessarily mean that both sides of the document are read at precisely the same time, but rather that both sides of the document are read around the same time by a one-time path.

It is also possible to simplify the processing flow shown in FIG. 9 with respect to two-sided document reading by executing the two-side simultaneous reading of step 106 in the case of reading a black and white document and sequentially reading the document with the inversion path of step 105 in the case of a color document. These modes can also be mixed and used in accordance with the type of the document sides.

Next, the method of conveying the documents in each document reading mode will be described using FIGS. 10 and 11.

Figure 10A:
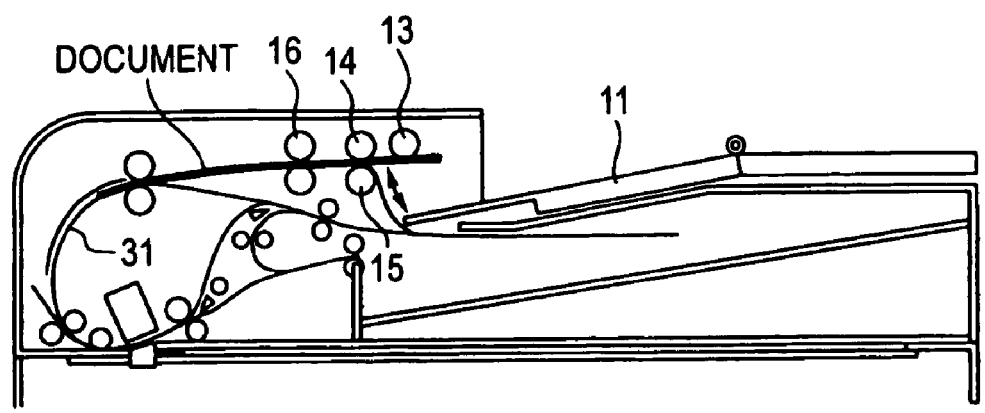
FIGS. 10A and 10B are diagrams for describing document paths in a one-side reading mode by one path and a second two-side reading mode where both sides of a document are simultaneously read by a single path.
Figure 10B:
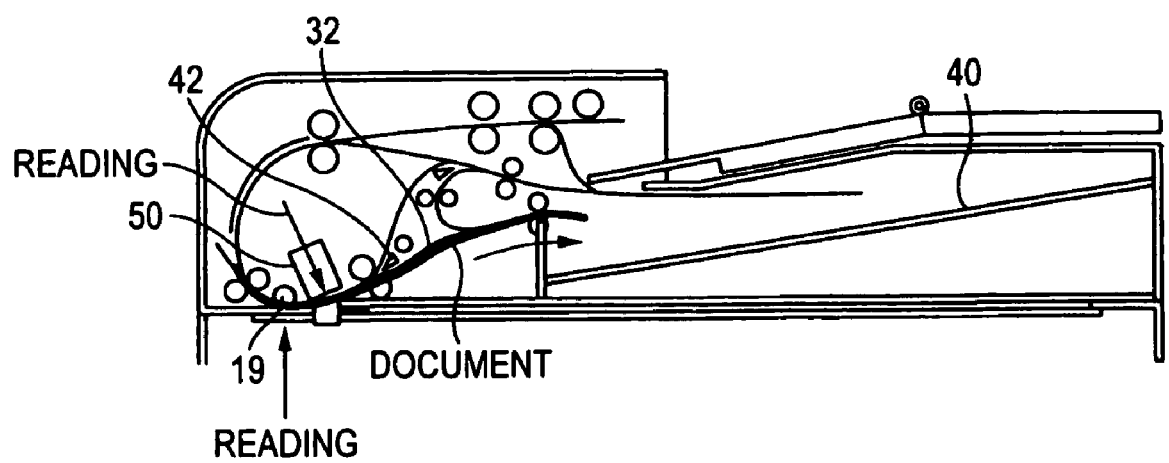

FIGS. 10A and 10B are diagrams showing the document path in the one-side reading mode by one path shown in step 102 of FIG. 9 and the document path in the second two-side reading mode that is a two-side simultaneous reading mode by one path shown in step 106. As shown in FIG. 10A, the documents placed in the document tray 11 are sequentially supplied to the first conveyance path 31 by the nudger roll 13, the feed roll 14, the retard roll 15 and the takeaway rolls 16. As shown in FIG. 10B, the supplied documents are moved to the second conveyance path 32 by the conveyance path switching gate 42 via the reading unit of the platen roll 19 and the reading unit of the CIS 50 and are sequentially discharged into the discharge tray 40. In the case of one-side reading, reading using the CCD image sensor 78 of the scanner device 70 shown in FIG. 1 is effected from below at the place of the platen roll 19. However, as mentioned previously, one-side reading using the CIS 50 is also possible. Also, in the case of two-side simultaneous reading by one path, the first side of the document is read using the CCD image sensor 78 of the scanner device 70 and the second side of the document is read using the CIS 50 during the same conveyance. Thus, it becomes possible to read both sides of the document by a one-time document path.

Figure 11A:
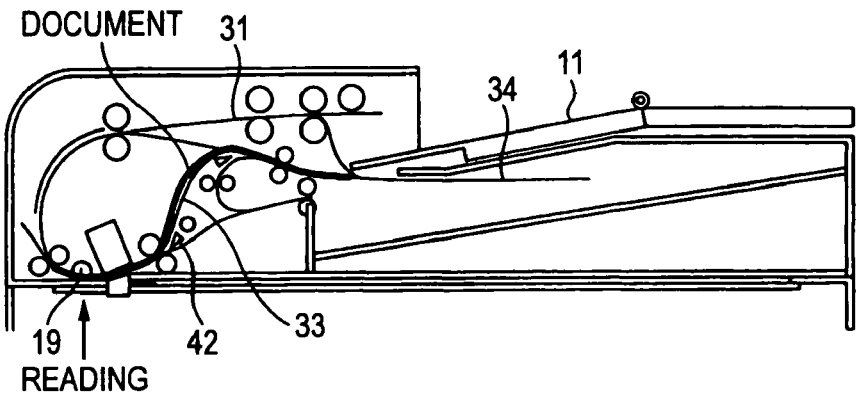
FIGS. 11A to 11D are diagrams for describing two-side reading by an inversion path.
Figure 11B:
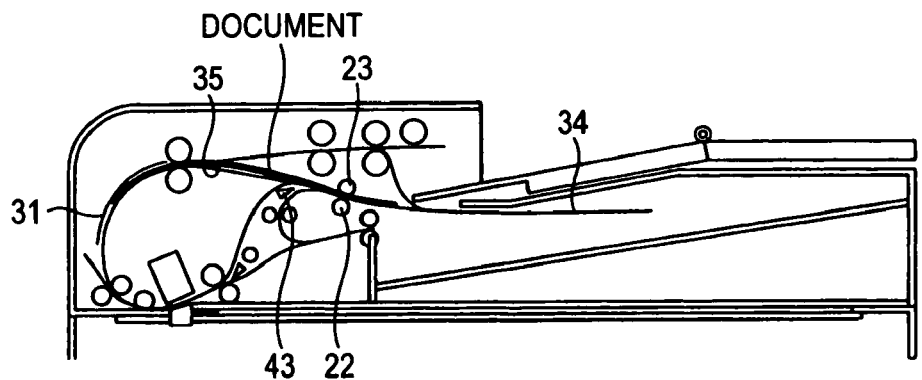

FIGS. 11A to 11D are diagrams for describing two-side reading by the inversion path shown in step 105 of FIG. 9, i.e., the first two-side reading mode. As shown in FIG. 11A, the documents placed in the document tray 11 are sequentially supplied to the first conveyance path 31, and reading is effected from below at the place of the platen roll 19 using the CCD image sensor 78 of the scanner device 70 shown in FIG. 1. Then, the document is moved to the fourth conveyance path 34 by the conveyance path switching gate 42 via the third conveyance path 33. As shown in FIG. 11B, the documents completely escaping the third conveyance path 33 are switched back by the inverter roll 22 and the inverter pinch roll 23 and supplied to the fifth conveyance path 35.

Figure 11C:
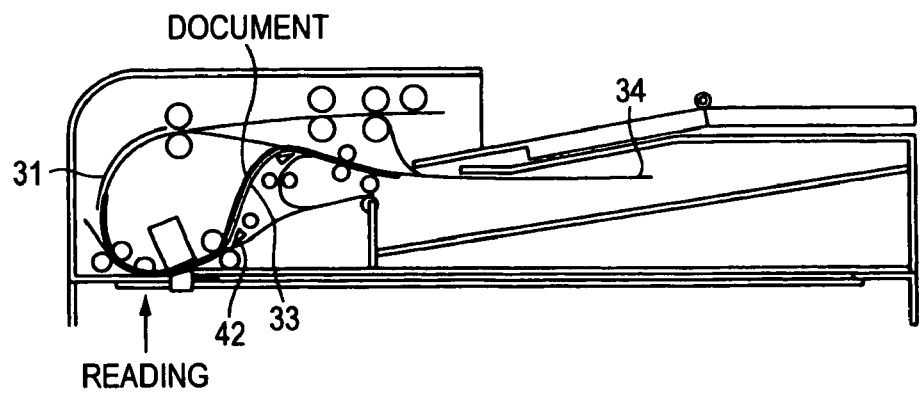
Figure 11D:
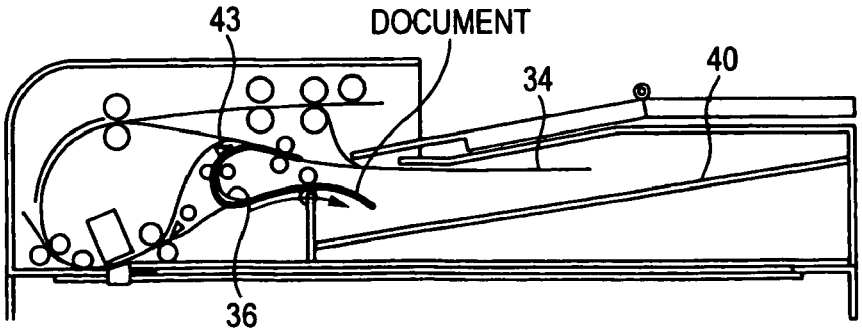

The documents supplied to the fifth conveyance path 35 are again supplied to the first conveyance path 31. Then, as shown in FIG. 11C, the documents are read from below by the CCD image sensor 78 of the scanner device 70. At this time, the documents are in a state where the front and back sides have been inverted in comparison to the case shown in FIG. 11A, and the second side that is different from the first side is read. The documents whose second sides have been read are in a state where the front and back sides have been inverted, and if they are discharged that way into the discharge tray 40, the page order of the stacked read documents becomes mixed up. Thus, as shown in FIG. 11C, the documents whose second sides have been read are moved to the fourth conveyance path 34 via the third conveyance path 33 using the conveyance path switching gate 42. As shown in FIG. 11D, the documents that have been supplied to the fourth conveyance path 34 and completely passed through the portion of the outlet switching gate 43 are sent to the sixth conveyance path 36 by the outlet switching gate 43 and discharged into the discharge tray 40. Thus, it becomes possible to arrange the page order of the documents after the documents are read in the first two-side reading mode, where images on both the front and back sides of the documents are sequentially read.

This image reading apparatus is disposed with the first two-side reading mode, where one side (first side) of a document is read using the CCD image sensor 78 that is the first sensor and then the document is inverted and the other side (second side) of the document is sequentially read with the first sensor, and the second two-side reading mode, where both the front and back (first and second sides) of a document are read during one conveyance using the first sensor and the CIS 50, which is the second sensor disposed at the side opposite from the first sensor facing the conveyance path. The image reading apparatus is configured so that these modes are selectable as needed, automatically, or on the basis of a setting of the user. Thus, for example, the two-side reading modes can be appropriately selected in accordance with the purpose-such as whether the output is to be black and white output or color output, and whether speed (productivity) is to be given priority or whether image quality is to be given priority-so that it becomes possible to use these modes.

Also, in this image reading apparatus, setting of the shading data used in shading correction is conducted in the scanner device 70 and the CIS 50 before an image reading job of a document by the document reading modes is initiated.

Figure 12:
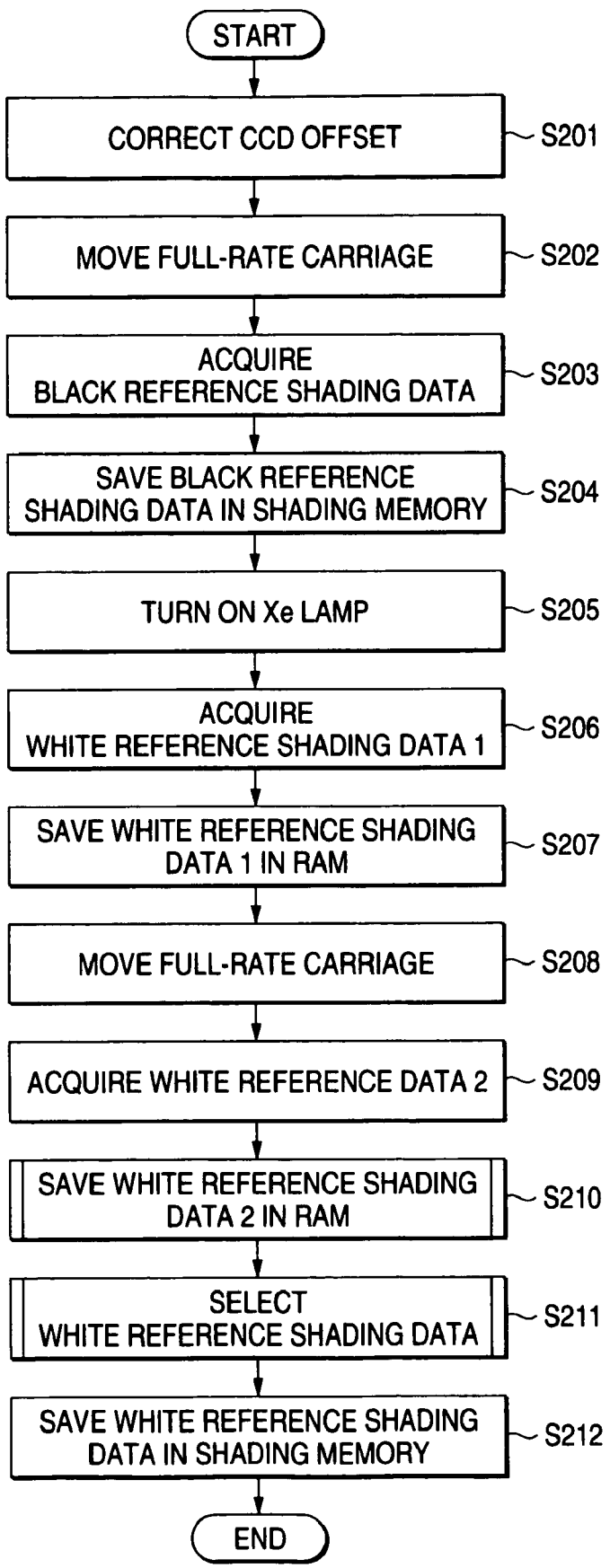
FIG. 12 is a flow chart showing the flow of shading data acquisition processing in a scanner device (CCD image sensor)

FIG. 12 is a flow chart showing the flow of shading data acquisition processing in the scanner device 70, i.e., the CCD image sensor 78. This processing is executed by the first CPU 101 of the first image processing circuit 100.

In this processing, first, offset correction (CCD offset correction) with respect to each sensor configuring the CCD image sensor 78 is conducted in the AFE 102 (step 201). Next, the full-rate carriage 73 is moved so that the first mirror 76A is positioned below the white reference tape 69 (step 202). In step 202, the Xe lamp 74 is OFF. Then, in a state where the Xe lamp 74 is OFF, reading of the white reference tape 69 by the CCD image sensor 78 is conducted and black reference shading data are acquired (step 203). Then, the acquired black reference shading data of the scanner device 70 are stored in the shading memory 121 disposed in the A integrated circuit 110 of the first image processing circuit 100 (step 204).

Next, the Xe lamp 74 is turned ON (step 205). Then, in a state where the Xe lamp 74 is ON, reading of the white reference plate 69 by the CCD image sensor 78 is conducted and white reference shading data (called "white reference shading data 1" below) are acquired (step 206). Then, the acquired white reference shading data 1 are stored in the RAM 104 disposed in the first image processing circuit 100 (step 207). Next, the full-rate carriage 73 is moved slightly while the first mirror 76A is retained in the state where it is positioned below the white reference plate 69 (step 208). Then, in a state where the Xe lamp 74 is ON, reading of the white reference plate 69 by the CCD image sensor 78 is conducted and white reference shading data (called "white reference shading data 2" below) are acquired again (step 209). Then, the acquired white reference shading data 2 are stored in the RAM 104 disposed in the first image processing circuit 100 (step 210). Moreover, the white reference shading data 1 and the white reference shading data 2 stored in the RAM 104 are compared with each other, and the data with the larger value, i.e., the data nearest to white, are selected as the white reference shading data (step 211). Then, the white reference shading data 1 or the white reference shading data 2 selected as the white reference shading data of the scanner device 70 are stored in the shading memory 121 disposed in the A integrated circuit 110 of the first image processing circuit 100 (step 212), and the series of processing ends.

Figure 13:
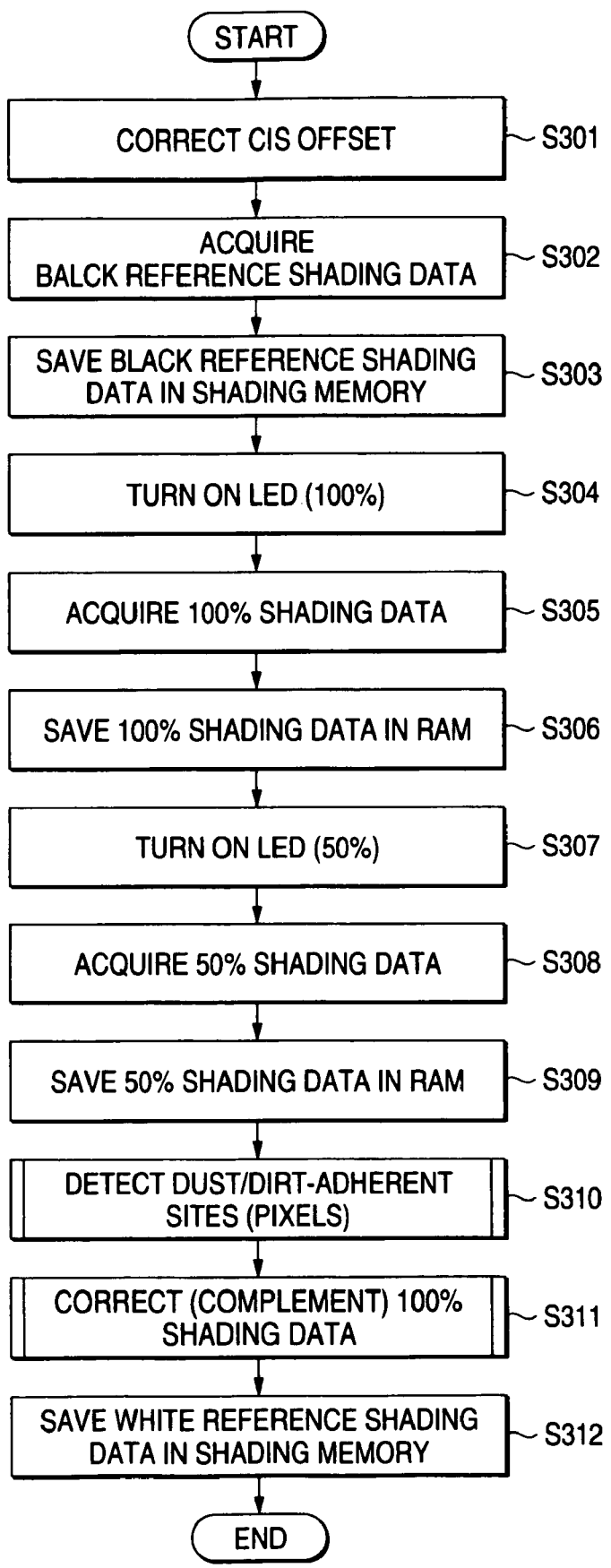
FIG. 13 is a flow chart showing the flow of shading data acquisition processing in the CIS.

FIG. 13 is a diagram showing the flow of shading data acquisition in the CIS 50. This processing is executed by the second CPU 201 of the second image processing circuit 200 including a function as a dust detection unit (abnormal site detection unit, abnormal place detection unit).

In this processing, first, offset correction (CIS offset correction) with respect to each sensor configuring the line sensor 54 of the CIS 50 is conducted in the AFE 82 (step 301). Next, in a state where the LEDs 52 are OFF, i.e., in a state where the intensity of the light is 0%, reading of the white reference tape 64 by the CIS 50 is conducted, black reference shading data are acquired (step 302), and the acquired black reference data of the CIS 50 are stored in the shading memory 221 disposed in the C integrated circuit 210 of the second image processing circuit 200 (step 303).

Next, the LEDs 52 are turned ON at the usual intensity of the light, i.e., so that the intensity of the light is at 100% (step 304). Then, in a state where the intensity of the light of the LEDs 52 is at 100% (first reading condition), reading of the white reference tape 64 by the CIS 50 is conducted, white reference shading data (first reading data: called 100% shading data SHD 100) are acquired (step 305), and the acquired 100% shading data SHD 100 are stored in the RAM 203 (step 306). Next, the LEDs 52 are turned ON at half the intensity of the light, i.e., so that the intensity of the light is at 50% (step 307). Then, in a state where the intensity of the light of the LEDs 52 is at 50% (second reading condition), reading of the white reference tape 64 by the CIS 50 is again conducted, white reference shading data (second reading data: called 50% shading data SHD 50 below) are acquired (step 308), and the acquired 50% shading data SHD 50 are stored in the RAM 203 (step 309). In the present embodiment, because the CIS 50 is fixed with respect to the white reference tape 64 during reading, the 100% shading data SHD 100 and the 50% shading data SHD 50 are acquired by reading the same position of the white reference tape 64. Also, the acquisition of the 100% shading data SHD 100 and the acquisition of the 50% shading data SHD 50 are the same with respect to the reading time (measurement time) by the line sensor 54. Moreover, the detection of dust/dirt-adherent sites (pixels) in the white reference tape 64 is conducted using the 100% shading data SHD 100 and the 50% shading data SHD 50 stored in the RAM 203 (step 310). Then, correction (complementation) of data is conducted in regard to pixels of the 100% shading data SHD 100 stored in the RAM 203 determined to be dust/dirt-adherent sites (step 311), the corrected data are stored as the white reference shading data of the CIS 50 in the shading memory 221 disposed in the C integrated circuit 210 of the second image processing circuit 200 (step 312), and the series of processing ends.

Figure 14:
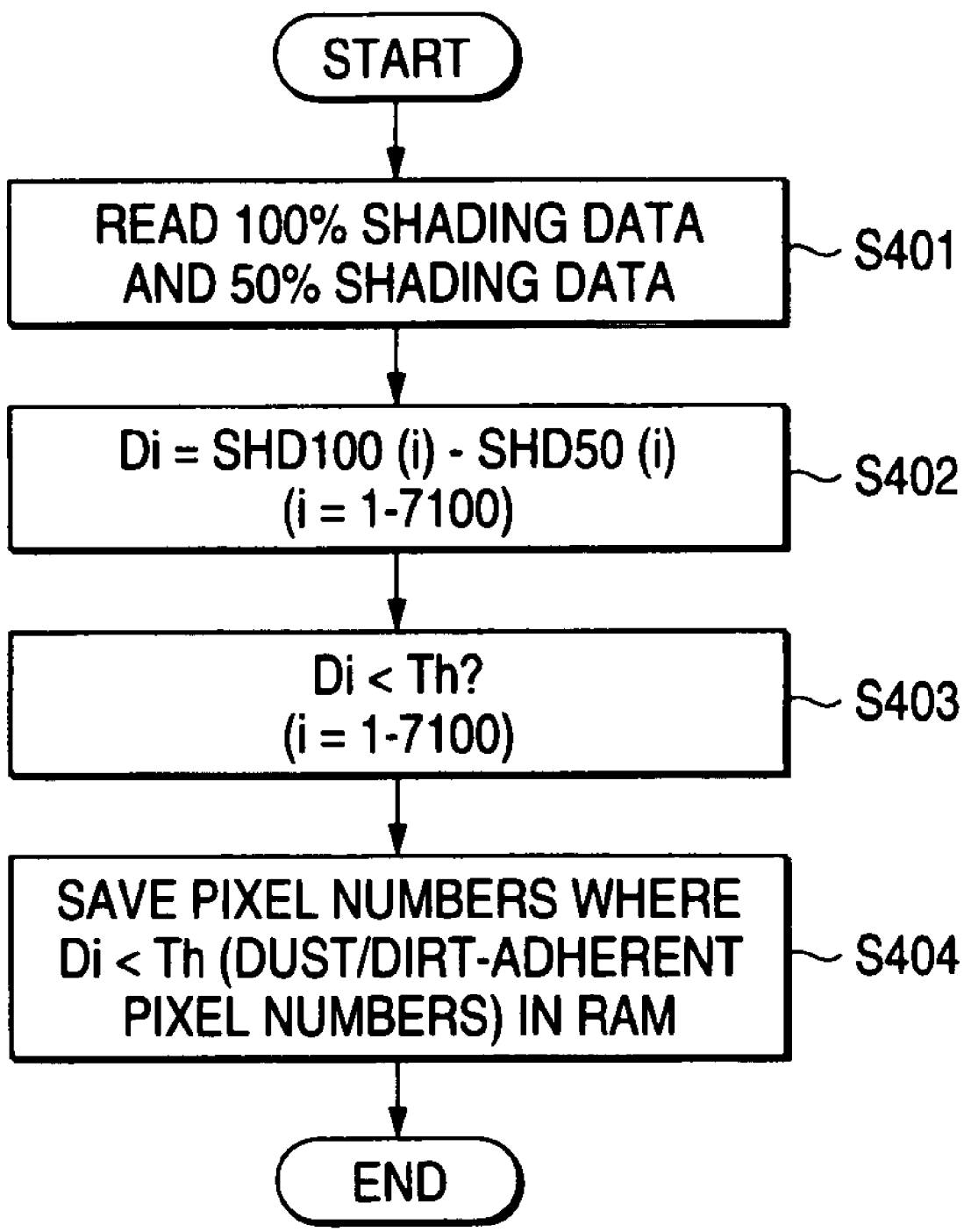
FIG. 14 is a flow chart showing the flow of processing in the detection of dust/dirt-adherent sites of the CIS.

Here, FIG. 14 is a flow chart showing the flow of processing in the detection of dust/dirt-adherent sites shown in step 310. This processing is also executed by the second CPU 201 of the second image processing circuit 200.

In this processing, first, the 100% shading data SHD 100 and the 50% shading data SHD 50 stored in the RAM 203 are read (step 401). Then, the difference Di between the 100% shading data SHD 100(*i*) and the 50% shading data SHD 50(*i*) in each pixel number Pi (i=1 to 7100) is determined (step 402). Next, it is determined whether or not each acquired difference Di (i=1 to 7100) of each pixel number Pi is smaller than a predefined threshold Th (step 403). Then, pixel numbers whose difference Di is smaller than the threshold Th are determined to be dust/dirt-adherent pixels, these pixel numbers Pi are stored in the RAM 203 as dust/dirt-adherent pixel numbers (step 404) and the processing ends.

Figure 15:
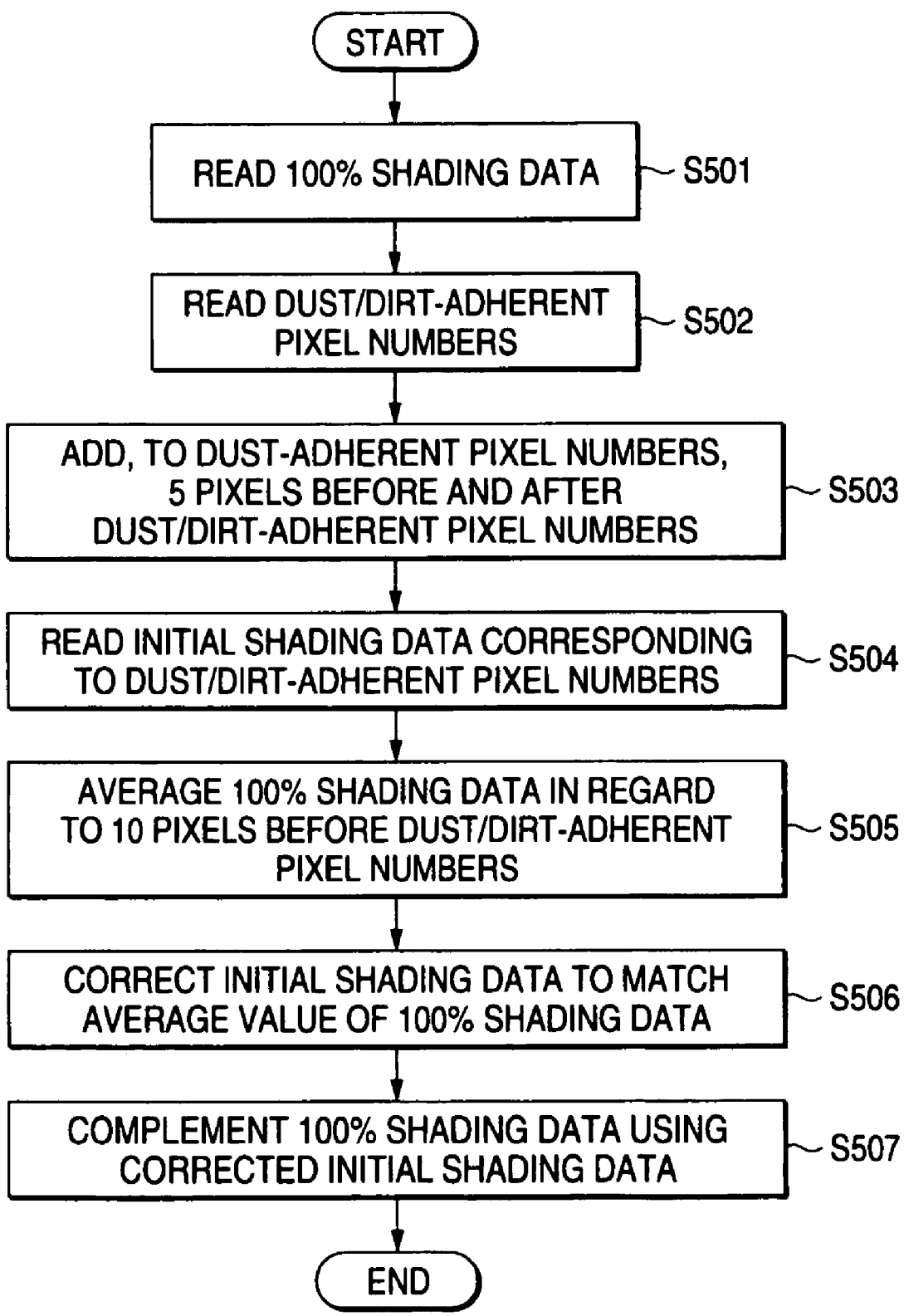
FIG. 15 is a flow chart showing the flow of processing in the correction (complementation) of 100% shading data of the CIS.

FIG. 15 is a flow chart showing the flow of processing in the correction (complementation) of the 100% shading data shown in step 311. This processing is also executed by the second CPU 201 of the second image processing circuit 200.

In this processing, first, the 100% shading data SHD 100 and the 50% shading data SHD 50 stored in the RAM 203 are read (step 501), and then the dust/dirt-adherent pixel numbers stored in the 203 are read (step 502). Next, five pixels before and after the read dust/dirt-adherent pixel numbers are added to the dust/dirt-adherent pixel numbers (step 503), and the data corresponding to the dust/dirt-adherent pixel numbers determined in step 503 are read from the initial shading data SHDini at the time of factory shipment stored in the FROM 202 (step 504). Next, ten pixels in front of the dust/dirt-adherent pixel numbers are retrieved from the 100% shading data and the average value thereof is obtained (step 505), and correction of the data read in step 504 is conducted using the obtained average value (step 506). Then, the data of the dust/dirt-adherent pixel numbers of the 100% shading data SHD 100 are complemented using the corrected data (step 507), and the processing ends.

Next, the processing shown in FIGS. 13 to 15 will be described in detail on the basis of a specific example.

Figure 16A:
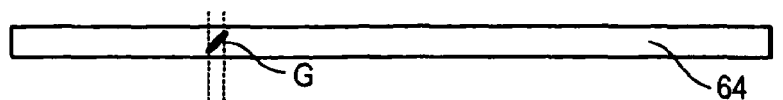
FIGS. 16A to 16D are diagrams describing processing for acquiring shading data in the CIS.

FIG. 16A shows the state of the white reference tape 64 at the time of the acquisition of the shading data. In this example, dirt G is adherent to part of the white reference tape 64, and on the basis of the result of reading this, shading data for the CIS 50 are generated.

Figure 16B:
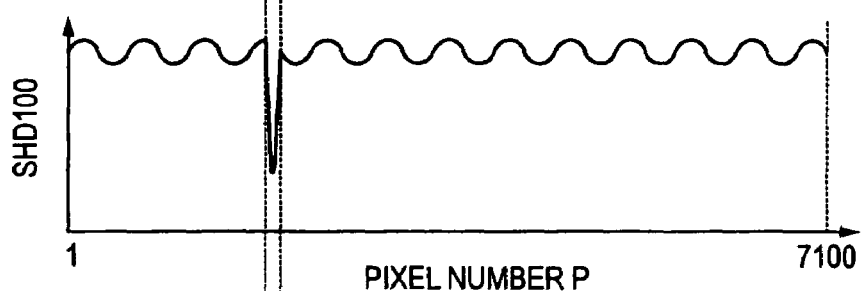

FIG. 16B shows the 100% shading data SHD 100 acquired in step 305 shown in FIG. 13 by reading the white reference tape 64 shown in FIG. 16A. In the same figure, the horizontal axis represents pixel numbers P (the same is true of FIGS. 16B and 16C). The amount of reflection light decreases remarkably at the site of the white reference tape 64 to which the dirt G is adherent in comparison to the sites to which the dirt G is not adherent. For this reason, the data corresponding to the portions to which dust and dirt are adherent drops remarkably from other sites. In FIG. 16B, the 100% shading data SHD 100 appear as waves with respect to the pixel direction, but this is because the SELFOC lens 53 is used in the CIS 50, and the periods of the waves correspond to the pitch of each lens disposed in the SELFOC lens 53.

Figure 16C:
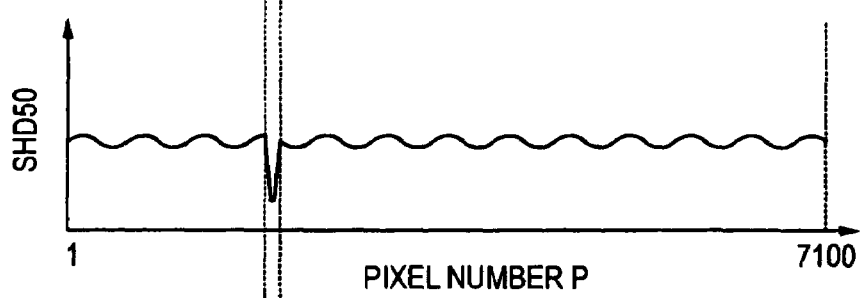

FIG. 16C shows the 50% shading data SHD 50 acquired in step 308 shown in FIG. 13 by reading the white reference tape 64 shown in FIG. 16A. By making the amount of light of the LEDs 52 50%, the 50% shading data SHD 50 become lower overall than the 100% shading data SHD 100. Also, the 50% shading data SHD 50 corresponding to portions to which dust and dirt are adherent also drop from other sites similarly to the 100% shading data SHD 100.

Figure 16D:
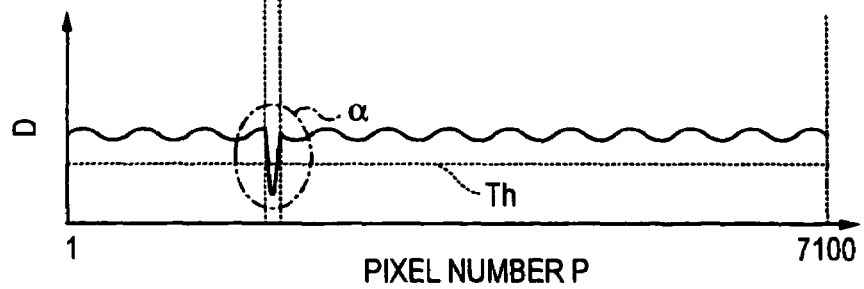

FIG. 16D shows the difference D between the 100% shading data SHD 100 and the 50% shading data SHD 50 determined in step 402 shown in FIG. 14. From FIG. 16D, it will be understood that the difference D is remarkably smaller at dust/dirt-adherent sites in comparison to sites to which dust and dirt are not adherent. According to the experiments of the present invention, it was ascertained that, whereas the amount of light reflected from the white reference surface (surface to which dust is not adherent) of the white reference tape 64 is reduced to substantially half when the intensity of the light of the LEDs 52 is reduced from 100% to 50%, the amount of light reflected from the dust/dirt-adherent surface of the white reference tape 64 is reduced somewhat, but the degree of the reduction is small in comparison to the white reference surface. The reason for this is thought to be that the amount of reflection light reflected towards the line sensor 54 by absorption and diffusion resulting from dust is reduced at dust/dirt-adherent sites, so that even when the intensity of the emitted light is greatly changed, the amount of reflected light is not affected that much. Thus, it can be determined that the sites where the difference D is small are regions to which the dust G is adherent. In the present embodiment, it is determined in step 403 shown in FIG. 14 whether or not the difference Di is smaller than the threshold Th, and it is determined whether or not this indicates dust/dirt-adherent sites.

Figure 17A:
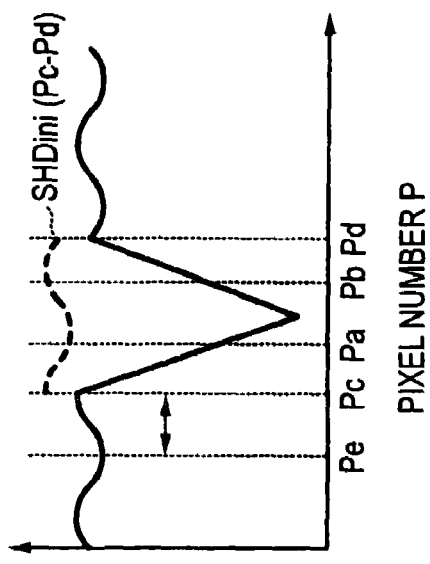
FIGS. 17A to 17D are diagrams (continued) describing shading data acquisition processing in the CIS.

FIG. 17A is a diagram where the vicinity of the α region shown in FIG. 16D, i.e., the dust/dirt-adherent site, is enlarged. In the present embodiment, it is determined whether or not the difference Di in each pixel is lower than the threshold Th in step 403 shown in FIG. 14, it is determined that pixel numbers Pa to Pb whose difference Di is lower than the threshold Th are dust/dirt-adherent sites, and these pixel numbers are stored in the RAM 203 in step 404 as dust/dirt-adherent pixel numbers.

Figure 17B:
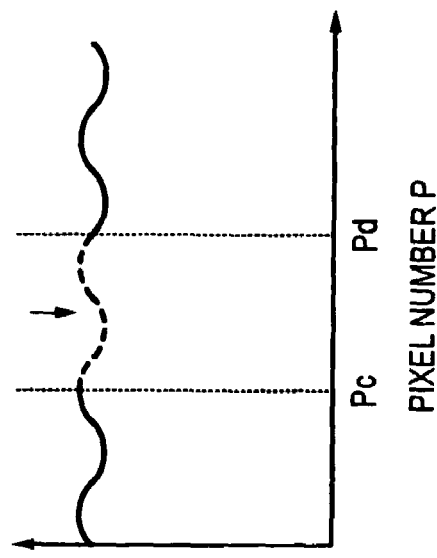

FIG. 17B is a diagram where the vicinity of the dust/dirt-adherent site of the 100% shading data SHD 100 read in step 501 shown in FIG. 15 is enlarged. In step 403, the 100% shading data SHD 100 shown in FIG. 16B are read. Also, in step 502 shown in FIG. 15, the dust/dirt-adherent pixel numbers (in this example, pixel numbers Pa to Pb) are read. Here, referring to FIG. 16B, the 100% shading data SHD 100 certainly show a drop at the region of the pixel numbers Pa and Pb, but it will be understood that, in actuality, abnormalities have arisen in the 100% shading data SHD 100 at the pixel numbers Pc to Pd including the peripheral pixels of pixel numbers Pa to Pb. Thus, in the present embodiment, five pixels before the dust/dirt-adherent pixel number Pa and five pixels after the dust- and dirt-adherent pixel number Pb are added to the dust/dirt-adherent pixel numbers in step 503 shown in FIG. 15. Here, the reason why the number of pixels added as the dust/dirt-adherent pixel numbers is five pixels is based on the experimental results of the inventor.

Figure 17C:
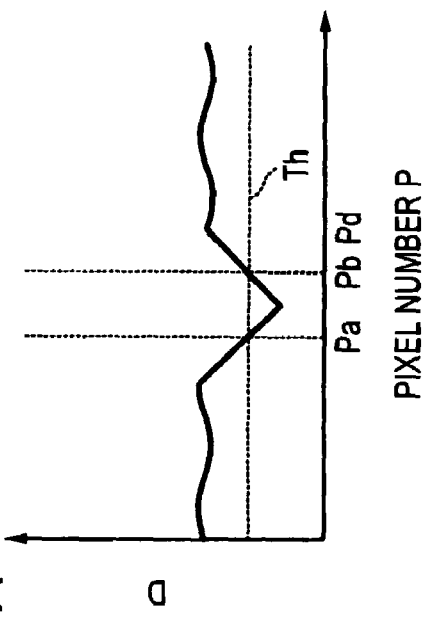

FIG. 17C shows the initial shading data SHDini stored in the FROM 202. In step 504 shown in FIG. 15, the data corresponding to the dust/dirt-adherent pixel numbers Pc to Pd are read from the initial shading data SHDini. The initial shading data SHDini exhibit the same characteristics as the present situation in regard to the wave form of the characteristic curve, i.e., the waves resulting from the SELFOC lens 53, but the absolute value of the data changes due to changes in the LEDs 52 and the white reference tape 64 through time. Thus, if the data corresponding to the dust/dirt-adherent pixel numbers Pc to Pd of the initial shading data SHDini are replaced with the pixel numbers of the 100% shading data SHD 100, the continuity of the data is lost as indicated by the dotted line in FIG. 17B, and as a result, stripes arise in the read image. Thus, in the present embodiment, in step 505 shown in FIG. 15, the average value of the 100% shading data SHD 100 is taken with regard to ten pixels before the dust/dirt-adherent pixel numbers, and in step 506, correction of the data is conducted so that it matches this average value. Specifically, the difference between the average value of the 100% shading data SHD 100 from pixel number Pe, which is the tenth pixel in front of the dust/dirt-adherent pixel number Pc shown in FIG. 17B, to the pixel number in front of the pixel number Pc and the initial shading data SHDini of pixel number Pc is taken, and this is deducted from the initial shading data SHDini of pixel numbers Pc to Pd.

Figure 17D:
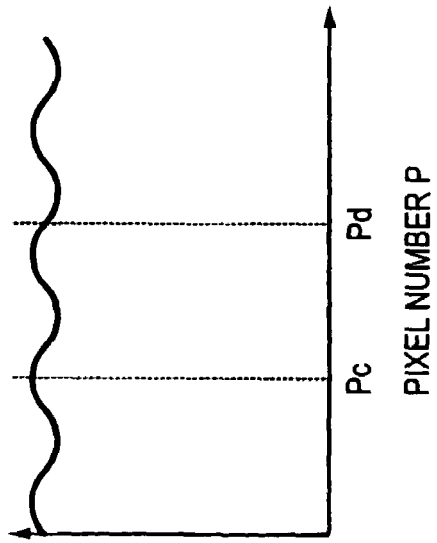

FIG. 17D shows the shading data SHD obtained in step 507 shown in FIG. 15. In the present embodiment, the initial shading data SHDini of the dust/dirt-adherent pixel numbers Pc to Pd are corrected by the aforementioned process, and the dust/dirt-adherent pixel numbers Pc to Pd of the 100% shading data are complemented, whereby the continuity of the shading data SHD is maintained. Also, because correction is conducted using the initial shading data SHDini, correction fitting the data waves accompanying the use of the SELFOC lens 53 is conducted.

As described above, in the present embodiment, the 100% shading data SHD 100 when the intensity of the light of the LEDs 52 is 100% and the 50% shading data SHD 50 when the intensity of the light of the LEDs 52 is 50% are acquired, and the difference D between the 100% shading data SHD 100 and the 50% shading data SHD 50 is determined, whereby dust/dirt-adherent sites (pixels) with respect to the white reference tape 64 can be easily identified. It also becomes possible to identity sites where recesses have arisen in the white reference tape 64. Additionally, in the present embodiment, because the dust/dirt-adherent sites (pixels) are determined on the basis of the 100% shading data SHD 100 and the 50% shading data SHD 50, the affect of shading data waves arising in accompaniment with the use of the SELFOC lens 53 can be removed.

Moreover, in the present embodiment, the 100% shading data SHD 100 of the dust/dirt-adherent pixels determined to be dust/dirt-adherent sites is complemented using the initial shading data SHDini, whereby the shading data SHD waves arising in accompaniment with the use of the SELFOC lens 53 can be reproduced, and more precise shading data SHD can be obtained. Also, in this case, because correction is conducted in consideration of the difference between the 100% shading data SHD 100 and the initial shading data SHDini resulting from the elapse of time, the continuity of the shading data can be maintained, and the shading data SHD can be made more precise. Moreover, in the present embodiment, because complementation of the 100% shading data SHD 100 is conducted including the peripheral pixels of the dust/dirt-adherent pixels determined to be dust/dirt-adherent sites, more precise shading data SHD can be obtained.

Thus, with the CIS 50 according to the present embodiment, it becomes possible to conduct more precise shading data correction with respect to the read image data, and stripes in the image data accompanying the adherence of dust and dirt to the white reference tape 64 can be prevented.

The present embodiment was configured so that the detection of dust/dirt-adherent sites was conduced using the 100% shading data SHD 100 and the 50% shading data SHD 50, but the invention is not limited thereto. Dust/dirt-adherent sites (pixels) can also be detected using plural shading data where the intensities of the light from the LEDs 52 are different.

SECOND EMBODIMENT

The present embodiment is substantially the same as the first embodiment, except that an Xe lamp is used as the light source of the CIS 50 instead of an LED. In the present embodiment, reference numerals that are the same as those of the first embodiment will be given to parts that are the same as those of the first embodiment, and detailed description of those parts will be omitted.

Figure 18:
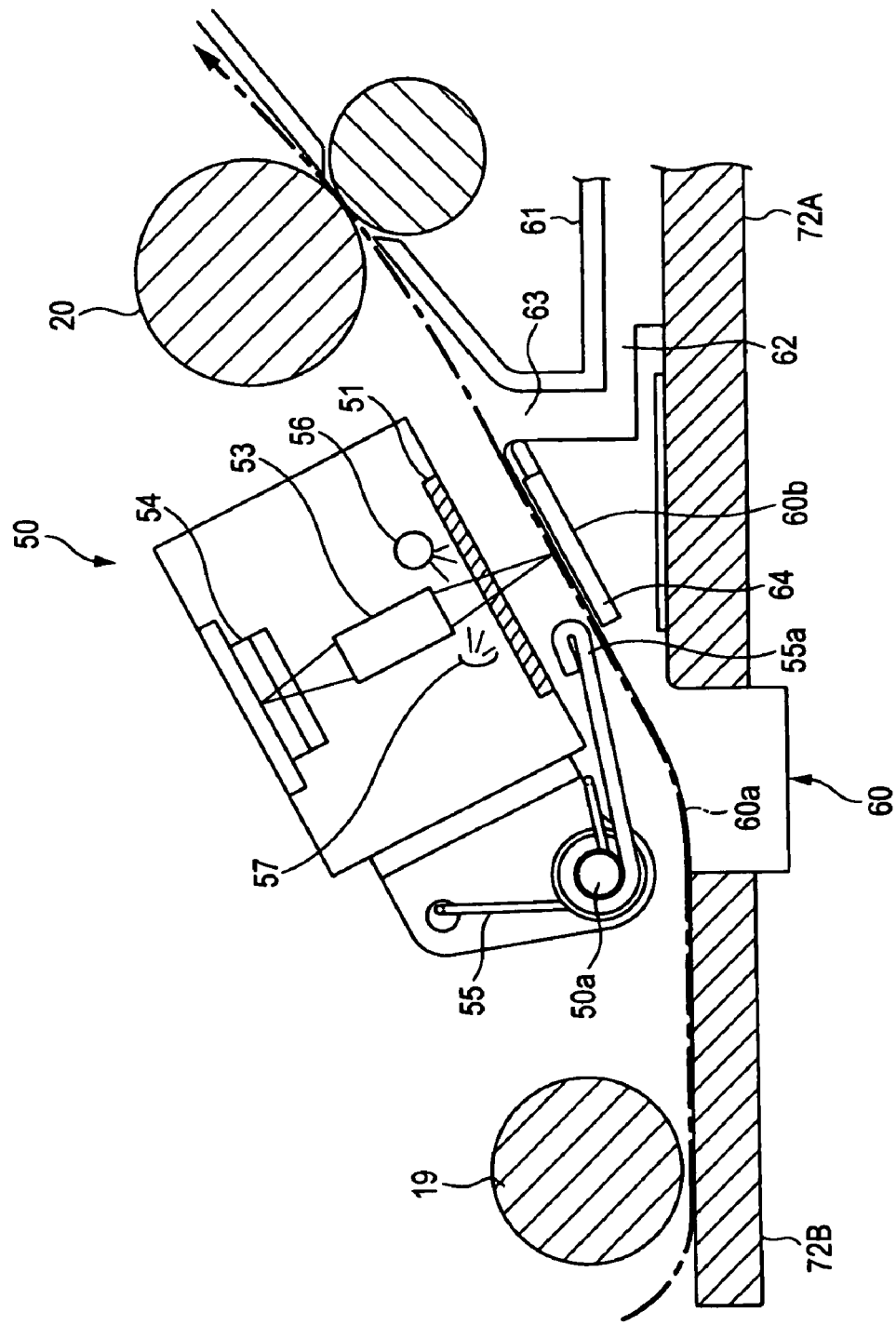
FIG. 18 is a diagram for describing the configuration of the CIS in a second embodiment of the invention.

FIG. 18 is a diagram for describing the CIS 50 pertaining to the present embodiment. In the present embodiment, as mentioned previously, an Xe lamp 56 is disposed as the light source of the CIS 50. Also, only one Xe lamp 56 is disposed, and a mirror 57 for irradiating the document with irradiation light irradiated from the Xe lamp 56 and reflected by the mirror 57 is attached at the other side. Here, in contrast to the LED, it is extremely difficult to adjust the intensity of the light emitted from the Xe lamp 56. For this reason, it is difficult to detect dust/dirt-adherent sites using the technique described in the first embodiment. Thus, in the present embodiment, the intensity of the light emitted from the Xe lamp 56 is maintained at a constant, the reading time (measurement time) for acquiring the shading data is varied, and two sets of shading data are acquired, whereby the detection of dust/dirt-adherent sites of the white reference tape 64 is conducted.

Figure 19:
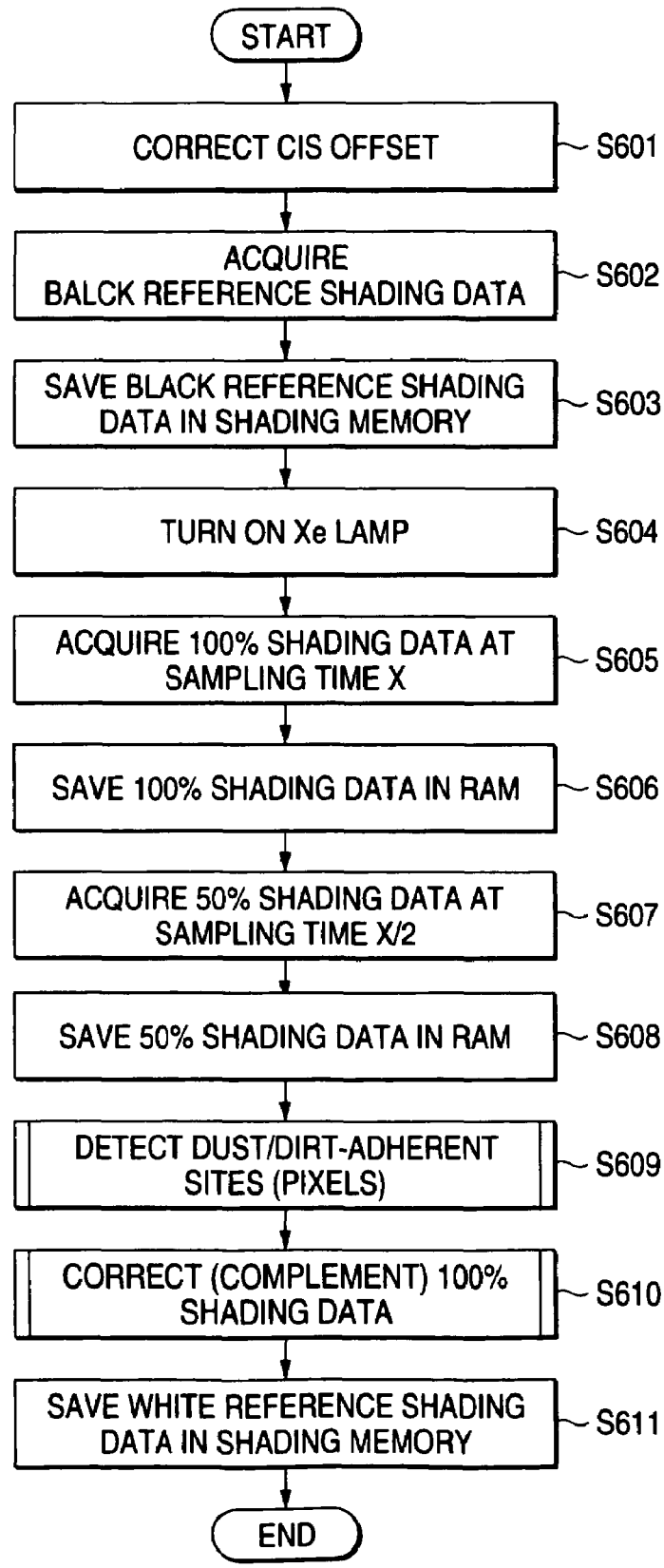
FIG. 19 is a flow chart showing the flow of shading data acquisition processing in the CIS.

FIG. 19 is a flow chart showing the flow of the acquisition of the shading data of the CIS 50. This processing is executed by the second CPU 201 of the second image processing circuit 200 including a function as a dust detection unit (abnormal site detection unit, abnormal place detection unit).

In this processing, first, offset correction (CIS offset correction) with respect to each sensor configuring the line sensor 54 of the CIS 50 is conducted in the AFE 82 (step 601). Next, in a state where the Xe lamp 56 is OFF, i.e., a state where the intensity of the light is at 0%, reading of the white reference tape 64 by the CIS 50 is conducted, black reference shading data are acquired (step 602), and the acquired black reference shading data of the CIS 50 are stored in the shading memory 221 disposed in the C integrated circuit 210 of the second image processing circuit 200 (step 603).

Next, the Xe lamp 56 is turned ON at the ordinary light intensity (step 604). Then, in a state where the Xe lamp 56 is ON, reading of the white reference tape 64 by the CIS 50 is conducted. At this time, white reference shading data (first shading data: 100% shading data SHD 100) are acquired at X (first reading condition) serving as the reading time (step 605), and the acquired 100% shading data SHD 100 are stored in the RAM 203 (step 606). Next, in a state where the Xe lamp 56 is ON, reading of the white reference tape 64 by the CIS 50 is conducted. At this time, white reference shading data (second shading data: 50% white shading data SHD 50) are acquired at X/2 (second reading condition), which is half of the previous time, serving as the reading time (step 607), and the acquired 50% shading data SHD 50 are stored in the RAM 203 (step 608). Moreover, detection of dust/dirt-adherent sites (pixels) of the white reference tape 64 is conducted using the 100% shading data SHD 100 and the 50% shading data SHD 50 stored in the RAM 203 (step 609). Then, correction (complementation) of the data is conducted in regard to pixels of the 100% shading data SHD 100 stored in the RAM 203 determined to be dust/dirt-adherent sites (step 610), and the corrected data are stored as the white reference shading data of the CIS 50 in the shading memory 221 disposed in the C integrated circuit 210 of the second image processing circuit 200 (step 611), and the series of processing ends. The detection of dust/dirt-adherent sites in step 609 is effected by the processing shown in FIG. 14 similarly to the first embodiment. Also, the data complementation of step 610 is effected by the processing shown in FIG. 15 similarly to the first embodiment.

In the present embodiment, two sets of shading data (the 100% shading data SHD 100 and the 50% shading data SHD 50) are acquired by varying the measurement times for acquiring the shading data, and the difference D between the 100% shading data SHD 100 and the 50% shading data 50 is determined, whereby detection of dust/dirt-adherent sites (pixels) is conducted. Thus, even in a case where the Xe lamp 56, where the intensity of the emitted light is considerably difficult to adjust, is used as the light source of the CIS 50, dust/dirt-adherent sites with respect to the white reference tape 64 can be easily identified.

In the first and second embodiments, description was given in regard to detection of dust/dirt-adherent sites and complementation of shading data during the acquisition of the shading data of the CIS 50, but the detection of dust/dirt-adherent sites and shading data complementation processing can also be conducted with respect to the scanner device 70 using the same technique.

Also, in the first and second embodiments, the invention was configured so that the shading data SHD were obtained by appropriately complementing the data of abnormal sites (pixels) of the 100% shading data SHD 100 when dust/dirt-adherent sites were detected, but the invention is not limited thereto. For example, the invention may also be configured so that when dust/dirt-adherent sites are detected, a message prompting the user to clean the white reference portion (such as "Please clean the white reference portion") is displayed on a screen (not shown) disposed at the user interface, and the cleaned white reference tape 64 is read thereafter to acquire the shading data SHD.

Moreover, in the first and second embodiments, description was given in regard to a case where the white reference tape 64 was used as the reference member, but the invention is not limited thereto. A reference member of another color may also be used.

Moreover, in the first and second embodiments, description was given in regard to a case where abnormalities arose in the reading result of the white reference tape 64 due to dust and dirt adhering to the white reference tape 64, but it is also possible for the color of the white reference tape 64 to change in accompaniment with deterioration as the white reference tape 64 is used over a long period of time, so that, as a result, abnormalities arise in the reading result of the white reference tape 64. Even in a case where the color of the white reference tape 64 changes in this manner, it is possible to easily identify the sites of the white reference tape 64 where the color has changed, by applying the techniques described in the first and second embodiments.

The entire disclosure of Japanese Patent Application No. 2004-082860 filed on Mar. 22, 2004 including specification, claims, drawings and abstract is incorporated herein by reference in its entirety.

What is claimed is:

1. An image reading apparatus comprising:
a light source that irradiates a document;
a sensor that receives reflection light reflected from the document;
a reference member that is read by the sensor; and
an abnormal site detection unit that detects, using first reading data acquired by reading at a position of the reference member according to a first intensity of irradiation light irradiated by the light source and second reading data acquired by reading at the same said position of the reference member according to a second intensity of irradiation light, which is smaller than the first intensity of irradiation light irradiated by the light source, abnormal sites in the first reading data or the second reading data;
wherein the abnormal site detection unit detects, as the abnormal sites, sites where a difference between the first reading data of the position of the reference member read by the first intensity of irradiation light and the second reading data of the same position of the reference member read by the second intensity of irradiation light is smaller than a threshold value.

2. The image reading apparatus of claim 1, wherein the abnormal site detection unit detects, as the abnormal sites, sites where dust or dirt is adherent to the reference member.

3. The image reading apparatus of claim 1, wherein intensities of irradiation light irradiated by the light source are different between the first reading condition and the second reading condition.

4. The image reading apparatus of claim 1, wherein the light source is a light emitting diode.

5. The image reading apparatus of claim 1, wherein the lengths of measurement times by the sensor are different between the first reading condition and the second reading condition.

6. The image reading apparatus of claim 1, wherein the light source is a xenon lamp.

7. The image reading apparatus of claim 1, wherein the first reading data are acquired by setting the intensity of the irradiation light of the light source to a condition when reading a document.

8. The image reading apparatus of claim 1, further comprising a complementation unit that complements data of the abnormal sites of the first reading data or the second reading data detected by the abnormal site detection unit.

9. A reference member foreign matter detecting method comprising:

reading at a position of a reference member under a first intensity of irradiation light to acquire first reading data;

reading at the same said position of the reference member under a second intensity of irradiation light that is smaller than the first intensity of irradiation light to acquire second reading data; and using the first reading data and the second reading data to detect the adherence of foreign matter to the reference member;

wherein the adherence of foreign matter is detected at sites where a difference between the first reading data of the position of the reference member read by the first intensity of irradiation light and the second reading data of the same position of the reference member read by the second intensity of irradiation light is smaller than a threshold value.

10. The reference member foreign matter detecting method of claim 9, wherein the intensities of irradiation light irradiated by a light source are different in the first reading condition and the second reading condition.

11. The reference member foreign matter detecting method of claim 9, wherein reading times by a sensor are different in the first reading condition and the second reading condition.

* * * * *